United States Patent
Jang

(10) Patent No.: US 12,355,959 B2
(45) Date of Patent: *Jul. 8, 2025

(54) IMAGE OR VIDEO CODING USING DEBLOCKING FILTERING

(71) Applicant: LG Electronics Inc., Seoul (KR)

(72) Inventor: Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,987

(22) Filed: Apr. 18, 2024

(65) Prior Publication Data

US 2024/0267517 A1 Aug. 8, 2024

Related U.S. Application Data

(63) Continuation of application No. 17/620,936, filed as application No. PCT/KR2020/007908 on Jun. 18, 2020, now Pat. No. 11,997,265.

(60) Provisional application No. 62/863,252, filed on Jun. 18, 2019.

(51) Int. Cl.
H04N 19/117 (2014.01)
H04N 19/132 (2014.01)
H04N 19/176 (2014.01)
H04N 19/186 (2014.01)
H04N 19/80 (2014.01)

(52) U.S. Cl.
CPC ......... H04N 19/117 (2014.11); H04N 19/132 (2014.11); H04N 19/176 (2014.11); H04N 19/186 (2014.11); H04N 19/80 (2014.11)

(58) Field of Classification Search
None
See application file for complete search history.

(56) References Cited

U.S. PATENT DOCUMENTS

2023/0276076 A1* 8/2023 Chen ................. H04N 19/82

* cited by examiner

*Primary Examiner* — Samuel D Fereja
(74) *Attorney, Agent, or Firm* — Fish & Richardson P.C.

(57) ABSTRACT

According to the disclosure of the present document, filter length can be determined on the basis of the distance between block boundaries in a deblocking filtering process, the deblocking filtering can be performed on the basis of the filter length, and thereby, the picture quality of the image/video can be enhanced, and the effects of improved subjective picture quality relative to complexity and simplification of H/W design can be obtained.

4 Claims, 22 Drawing Sheets

(a)

(b)

(a)

(b)

(a)

(b)

IMAGE OR VIDEO CODING USING DEBLOCKING FILTERING

CROSS-REFERENCE TO RELATED APPLICATIONS

This application is a continuation of U.S. application Ser. No. 17/620,936, filed on Dec. 20, 2021, which is a National Stage application under 35 U.S.C. § 371 of International Application No. PCT/KR2020/007908, filed on Jun. 18, 2020, which claims the benefit of U.S. Provisional Application No. 62/863,252, filed on Jun. 18, 2019. The disclosures of the prior applications are incorporated by reference in their entirety.

BACKGROUND OF THE DISCLOSURE

Field of the Disclosure

The present disclosure relates to video or image coding and, for example, to an image or video coding technique using deblocking filtering.

Related Art

The demands for high-resolution and high-quality images and video, such as an ultra-high definition (UHD) image and video of 4K or 8K or more, are recently increasing in various fields. As image and video data become high resolution and high quality, the amount of information or the number of bits that is relatively transmitted is increased compared to the existing image and video data. Accordingly, if image data is transmitted using a medium, such as the existing wired or wireless wideband line, or image and video data are stored using the existing storage medium, transmission costs and storage costs are increased.

Furthermore, interests and demands for immersive media, such as virtual reality (VR), artificial reality (AR) content or a hologram, are recently increasing. The broadcasting of an image and video having image characteristics different from those of real images, such as game images, is increasing.

Accordingly, there is a need for a high-efficiency image and video compression technology in order to effectively compress and transmit or store and playback information of high-resolution and high-quality images and video having such various characteristics.

Further, there is a discussion on deblocking filtering to improve image/video quality. In particular, there is a need for a method for reducing complexity and improving subjective image quality by efficiently determining a filter length in a deblocking filtering process.

SUMMARY

An object of the present disclosure is to provide a method and apparatus for improving video/image coding efficiency.

Another object of the present disclosure is to provide a method and apparatus for improving video/image quality.

Another object of the present disclosure is to provide a method and apparatus for determining a filter length based on a distance between neighboring edges in a process of performing deblocking filtering.

According to an embodiment of the present disclosure, in a deblocking filtering process, a filter length may be determined based on a distance between block boundaries and deblocking filtering may be performed based on the filter length.

According to an embodiment of the present disclosure, a filter length for a luma component block may be derived as 0, 3, 5, or 7 based on whether the distance between block boundaries is less than or equal to 4, 8, or 16.

According to an embodiment of the present disclosure, a filter length for a chroma component block may be derived as 0, 1, or 3 based on whether the distance between block boundaries is less than or equal to 2 or 4.

According to an embodiment of the present disclosure, deblocking filtering may be performed on a block boundary based on whether a boundary strength for the block boundary is greater than 0 for a chroma component block.

According to an embodiment of the present disclosure, a video/image decoding method performed by a decoding apparatus is provided. The video/image decoding method may include a method disclosed in embodiments of the present disclosure.

According to an embodiment of the present disclosure, a decoding apparatus for performing video/image decoding is provided. The decoding apparatus may perform a method disclosed in the embodiments of the present disclosure.

According to an embodiment of the present disclosure, a video/image encoding method performed by an encoding apparatus is provided. The video/image encoding method may include a method disclosed in the embodiments of the present disclosure.

According to an embodiment of the present disclosure, an encoding apparatus for performing video/image encoding is provided. The encoding apparatus may perform a method disclosed in the embodiments of the present disclosure.

According to one embodiment of the present disclosure, there is provided a computer-readable digital storage medium in which encoded video/image information generated according to the video/image encoding method disclosed in at least one of the embodiments of the present disclosure is stored.

According to an embodiment of the present disclosure, there is provided a computer-readable digital storage medium in which encoded information or encoded video/image information causing the decoding apparatus to perform the video/image decoding method disclosed in at least one of the embodiments of the present disclosure is stored.

Advantageous Effects

The present disclosure may have various effects. For example, the image/video quality can be improved. In addition, it is possible to improve subjective image quality against complexity and simplify an H/W design process by effectively determining a filter length based on a distance between block boundaries in a process of performing deblocking filtering. In addition, it is possible to provide an aligned filtering boundary between a luma component and a chroma component, to provide a uniform filter length for each block boundary, and to enable parallel processing.

Effects that can be obtained through specific embodiments of the present disclosure are not limited to the effects listed above. For example, various technical effects that can be understood or derived by a person having ordinary skill in the related art from the present disclosure may exist. Accordingly, the specific effects of the present disclosure are not limited to those explicitly described in the present disclosure and may include various effects that can be understood or derived from the technical characteristics of the present disclosure.

DESCRIPTION OF EXEMPLARY EMBODIMENTS

Figure 1:
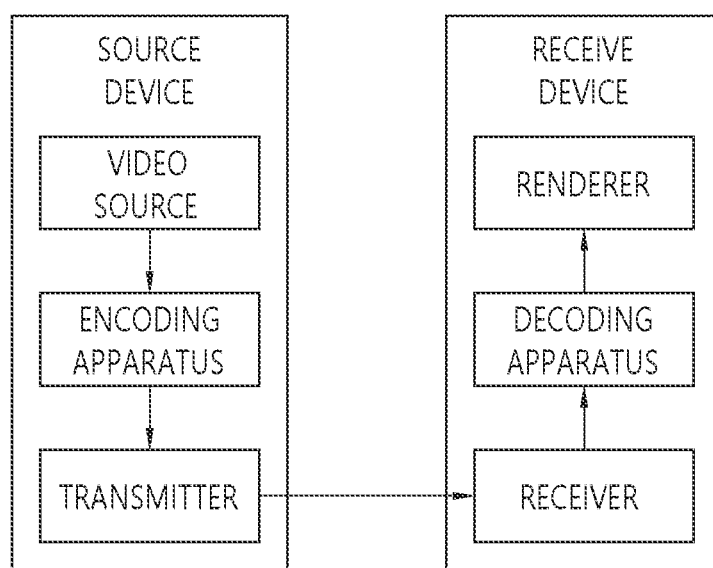
FIG. 1 schematically shows an example of a video/image coding system applicable to embodiments of the present disclosure.

This document may be modified in various ways and may have various embodiments, and specific embodiments will be illustrated in the drawings and described in detail. However, this does not intend to limit this document to the specific embodiments. Terms commonly used in this specification are used to describe a specific embodiment and is not used to limit the technical spirit of this document. An expression of the singular number includes plural expressions unless evidently expressed otherwise in the context. A term, such as "include" or "have" in this specification, should be understood to indicate the existence of a characteristic, number, step, operation, element, part, or a combination of them described in the specification and not to exclude the existence or the possibility of the addition of one or more other characteristics, numbers, steps, operations, elements, parts or a combination of them.

Meanwhile, elements in the drawings described in this document are independently illustrated for convenience of description related to different characteristic functions. This does not mean that each of the elements is implemented as separate hardware or separate software. For example, at least two of elements may be combined to form a single element, or a single element may be divided into a plurality of elements. An embodiment in which elements are combined and/or separated is also included in the scope of rights of this document unless it deviates from the essence of this document.

In this document, the term "A or B" may mean "only A", "only B", or "both A and B". In other words, in this document, the term "A or B" may be interpreted to indicate "A and/or B". For example, in this document, the term "A, B or C" may mean "only A", "only B", "only C", or "any combination of A, B and C".

A slash "/" or a comma used in this document may mean "and/or". For example, "A/B" may mean "A and/or B". Accordingly, "A/B" may mean "only A", "only B", or "both A and B". For example, "A, B, C" may mean "A, B or C".

In this document, "at least one of A and B" may mean "only A", "only B", or "both A and B". Further, in this document, the expression "at least one of A or B" or "at least one of A and/or B" may be interpreted the same as "at least one of A and B".

Further, in this document, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in this document may mean "for example". Specifically, in the case that "prediction (intra prediction)" is expressed, it may be indicated that "intra prediction" is proposed as an example of "prediction". In other words, the term "prediction" in this document is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

This document relates to video/image coding. For example, the methods/embodiments disclosed in this document may be applied to a method disclosed in the versatile video coding (VVC). Further, the methods/embodiments disclosed in this document may be applied to a method disclosed in the essential video coding (EVC) standard, the AOMedia Video 1 (AV1) standard, the 2nd generation of audio video coding standard (AVS2), or the next generation video/image coding standard (ex. H.267 or H.268, etc.).

This document presents various embodiments of video/image coding, and the embodiments may be performed in combination with each other unless otherwise mentioned.

In this document, a video may mean a set of a series of images according to the passage of time. A picture generally means a unit representing one image in a specific time period, and a slice/tile is a unit constituting a part of the picture in coding. The slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within the picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, a sample may mean a pixel value in the spatial domain, or may mean a transform coefficient in the frequency domain when the pixel value is transformed into the frequency domain.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

Also, in this document, at least one of quantization/dequantization and/or transform/inverse transform may be omitted. When the quantization/dequantization is omitted, the quantized transform coefficient may be referred to as a transform coefficient. When the transform/inverse transform is omitted, transform coefficients may be called coefficients or residual coefficients, or may still be called transform coefficients for the sake of uniformity of expression.

In this document, a quantized transform coefficient and a transform coefficient may be referred to as a transform coefficient and a scaled transform coefficient, respectively. In this case, the residual information may include information about the transform coefficient(s), and the information about the transform coefficient(s) may be signaled through a residual coding syntax. Transform coefficients may be derived based on residual information (or information about transform coefficient(s)), and scaled transform coefficients may be derived through inverse transform (scaling) on the transform coefficients. Residual samples may be derived based on an inverse transform (transform) for the scaled transform coefficients. This may be applied/expressed in other parts of this document as well.

In this document, technical features individually explained in one drawing may be individually implemented, or may be simultaneously implemented.

Hereinafter, preferred embodiments of this document are described more specifically with reference to the accompanying drawings. Hereinafter, in the drawings, the same reference numeral is used in the same element, and a redundant description of the same element may be omitted.

FIG. 1 schematically illustrates an example of a video/image coding system to which embodiments of this document may be applied.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
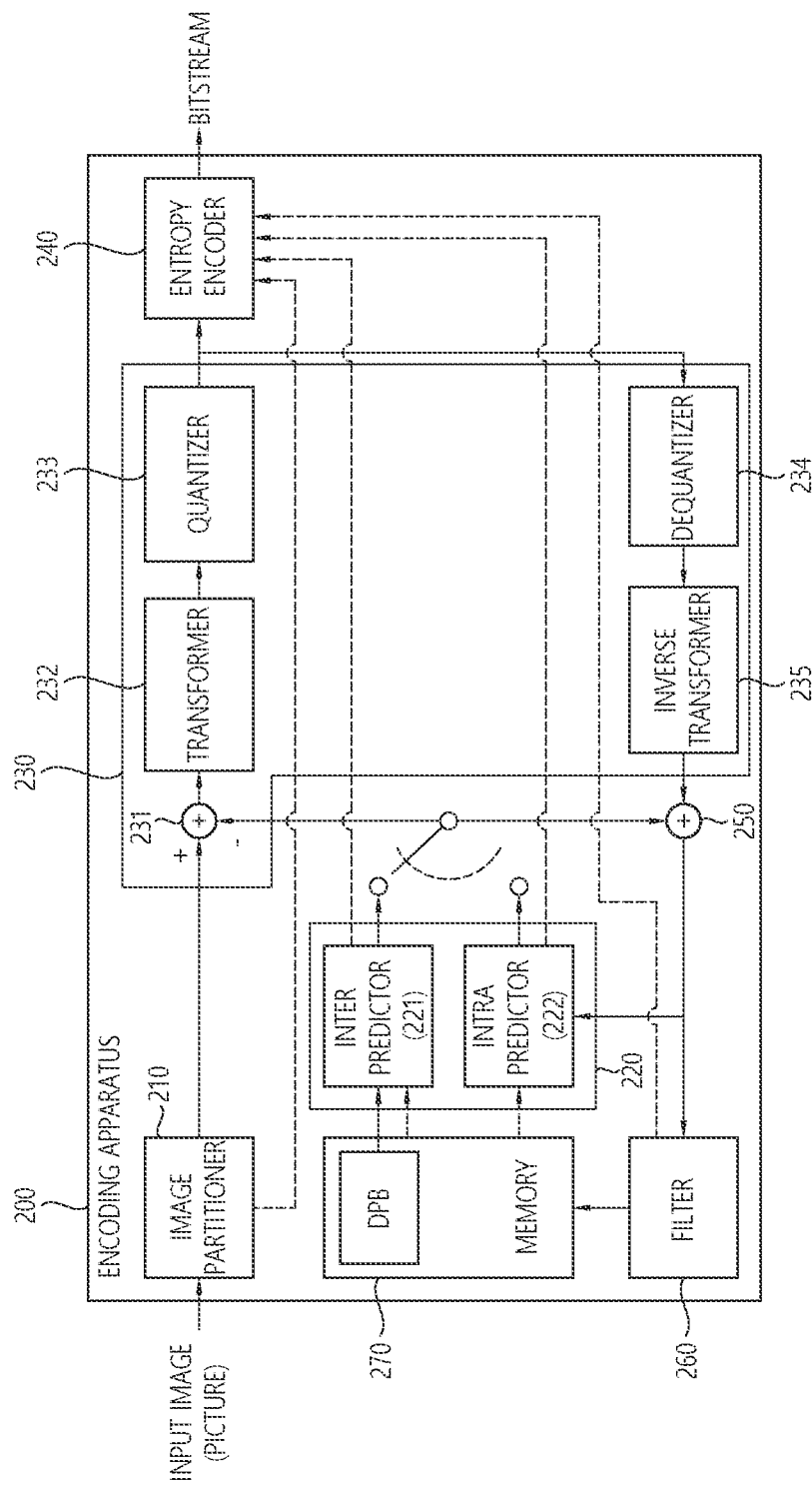
FIG. 2 is a diagram schematically illustrating a configuration of a video/image encoding apparatus to which embodiments of the present disclosure are applicable.

FIG. 2 is a schematic diagram illustrating a configuration of a video/image encoding apparatus to which the embodiment(s) of the present document may be applied. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
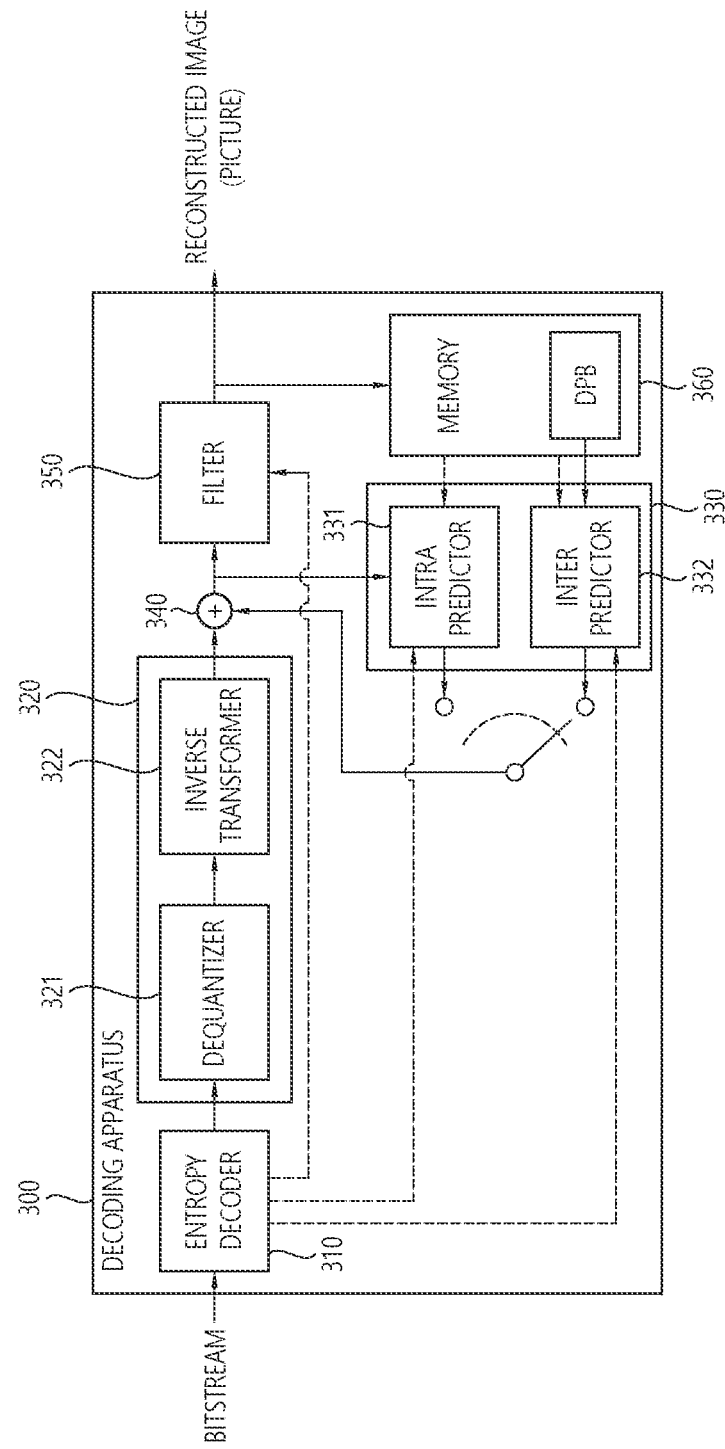
FIG. 3 is a diagram schematically illustrating a configuration of a video/image decoding apparatus to which embodiments of the present disclosure are applicable.

FIG. 3 is a schematic diagram illustrating a configuration of a video/image decoding apparatus to which the embodiment(s) of the present document may be applied. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, can be generated through the prediction. In this case, the predicted block includes the prediction samples in a spatial domain (or pixel domain). The predicted block is identically derived in the encoding apparatus and the decoding apparatus. The encoding apparatus can enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

Further, to improve subjective/objective image qualities, the encoding apparatus/the decoding apparatus may apply various filtering methods to the reconstructed picture to generate a modified reconstructed picture. The modified reconstructed picture may be stored in the memories, specifically, the DPB of the memories 270, 360 of the encoding apparatus/the decoding apparatus. Various filtering methods may include, for example, a deblocking filter, a sample adaptive offset, an adaptive loop filter, and a bilateral filter.

Meanwhile, in the image/video coding, the picture constituting the image/the video may be encoded/decoded in a series of decoding order. A picture order corresponding to an output order of the decoded picture may be set to be different from the decoding order, and based on the above, a backward prediction as well as a forward prediction may be performed upon inter prediction.

A picture decoding procedure may schematically include a picture reconstruction procedure and an in-loop filtering procedure for a reconstructed picture. A modified reconstructed picture may be generated through an in-loop filtering procedure, and the modified reconstructed picture may be output as a decoded picture, stored in the decoded picture buffer 360 or the memory of the decoding apparatus and used as a reference picture in an inter prediction procedure at the time of decoding a picture thereafter. The in-loop filtering procedure may include a deblocking filtering procedure, a sample adaptive offset (SAO) procedure, an adaptive loop filter (ALF) procedure, and/or a bi-lateral filter procedure, as described above. In this case, one or some of the deblocking filtering procedure, the sample adaptive offset (SAO) procedure, the adaptive loop filter (ALF) procedure, and the bi-lateral filter procedure may be sequentially applied, or all may be sequentially applied. For example, after the deblocking filtering procedure is applied to the reconstructed picture, the SAO procedure may be performed. Alternatively, for example, after the deblocking filtering procedure is applied to the reconstructed picture, the ALF procedure may be performed. This may also be performed in the encoding apparatus.

A picture encoding procedure may include not only a procedure of encoding information for picture reconstruction (e.g., partitioning information, prediction information, residual information, etc.) and outputting the information in the form of a bitstream but also a procedure of generating a reconstructed picture for the current picture and applying in-loop filtering thereto. In this case, a modified reconstructed picture may be generated through the in-loop filtering procedure, stored in the decoded picture buffer 270 or the memory and used as a reference picture in an inter prediction procedure at the time of encoding a picture thereafter as in the case of the decoding apparatus. When the in-loop filtering procedure is performed, (in-loop) filtering related information (parameters) may be encoded by the entropy encoding unit 240 and output in the form of a bitstream, and the decoding apparatus may perform the in-loop filtering procedure through the same method as that of the encoding apparatus based on the filtering related information.

Figure 4:
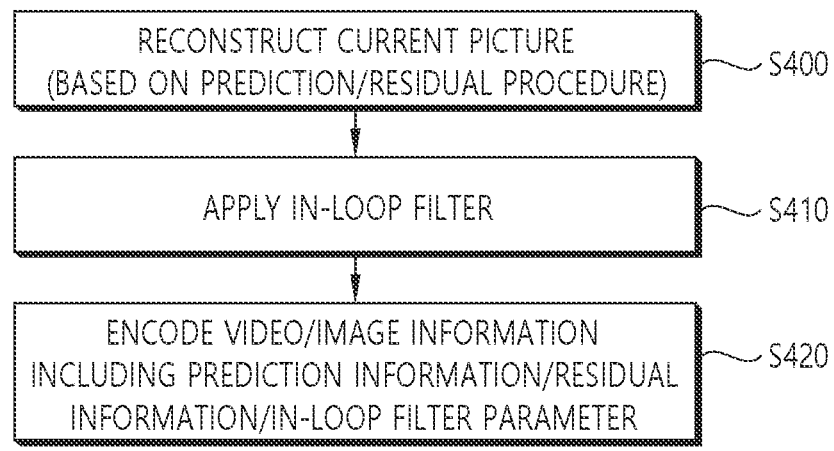
FIG. 4 schematically shows an in-loop filtering based image/video method and FIG. 5 schematically shows a filtering unit in an encoding apparatus.
Figure 5:
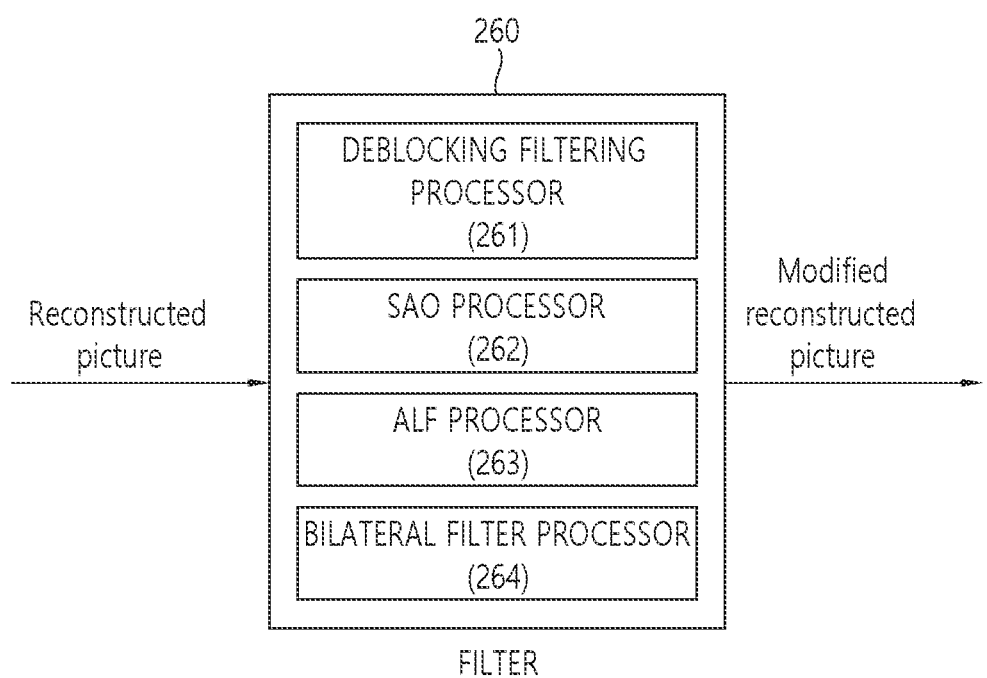

Through this in-loop filtering procedure, noise generated during video/video coding, such as blocking artifacts and ringing artifacts, can be reduced and subjective/objective visual quality can be improved. In addition, by performing the in-loop filtering procedure in both the encoding apparatus and the decoding apparatus, the encoding apparatus and the decoding apparatus can derive the same prediction result, improve the reliability of picture coding, and reduce the amount of data that need to be transmitted for picture coding FIG. 4 schematically illustrates an in-loop filtering based video/video method and FIG. 5 schematically illustrates a filtering unit in the encoding apparatus. The filter in the encoding apparatus of FIG. 5 may be the same as or corresponding to the filter 260 of the encoding apparatus 200 of FIG. 2 described above.

Referring to FIG. 4 and FIG. 5, the encoding apparatus generates a reconstructed picture for the current picture (S400). As described above with reference to FIG. 2, the encoding apparatus may generate a reconstructed picture through procedures such as partitioning, intra/inter prediction, and residual processing performed on the input original picture. Specifically, the encoding apparatus may generate prediction samples for the current block through intra or inter prediction, generate residual samples based on the prediction samples, transforms/quantizes the residual samples, and then performs dequantization/inverse transformation processing thereon to derive (modified) residual samples. The reason for performing dequantization/inverse transformation again after transformation/quantization is to derive the same residual samples as the residual samples derived from the decoding apparatus as described above. This is because the quantization procedure is basically a lossy coding procedure and the transformation procedure is also lossy when reduced transform (RT) is applied. The encoding apparatus may generate a reconstructed block including reconstructed samples for the current block based on the prediction samples and the (modified) residual samples. The reconstructed picture may be generated based on the reconstructed block.

The encoding apparatus performs an in-loop filtering procedure on the reconstructed picture (S410). A modified reconstructed picture may be generated through the in-loop filtering procedure. The modified reconstructed picture may be stored in the decoded picture buffer 270 or memory as a decoded picture and may then be used as a reference picture in an inter prediction procedure at the time of encoding a picture thereafter. The in-loop filtering procedure may include a deblocking filtering procedure, a sample adaptive offset (SAO) procedure, an adaptive loop filter (ALF) procedure, and/or a bi-lateral filter procedure. S410 may be performed by the filter 260 of the encoding apparatus. Specifically, for example, the deblocking filtering procedure may be performed by the deblocking filtering processor 261, the SAO procedure may be performed by the SAO processor 262, the ALF procedure may be performed by the ALF processor 263, and the bilateral filtering procedure may be performed by the bilateral filter processor 264. Some of the aforementioned various filtering procedures may be omitted in consideration of image characteristics, complexity, efficiency, and the like, and in this case, related components in FIG. 5 may also be omitted.

The encoding apparatus may encode image information including information for picture reconstruction and (in-loop) filtering related information and output the encoded image information in the form of a bitstream (S420). The output bitstream may be transmitted to a decoding apparatus through a storage medium or a network. S420 may be performed by the entropy encoder 240 of the encoding apparatus. The information for picture reconstruction may include partitioning information, prediction information, residual information, and the like, which have been described above/will be described later. The filtering related information may include, for example, flag information indicating whether to apply entire in-loop filtering, flag information indicating whether each filtering procedure is applied, information on SAO type, information on an SAO offset value, information on the location of an SAO band, information on an ALF filtering shape, information on an ALF filtering coefficient, information on a bilateral filter shape, and/or information on a bilateral filter weight. Detailed filtering related information will be described later. Meanwhile, when some filtering methods are omitted as described above, information (parameters) on the omitted filtering methods may be omitted.

Figure 6:
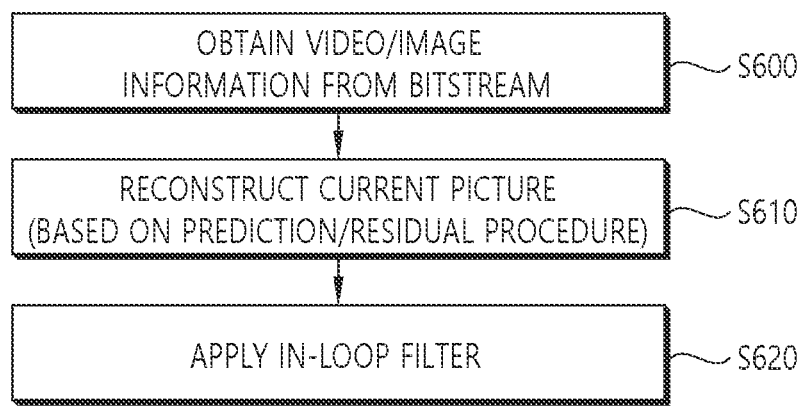
FIG. 6 schematically shows an in-loop filtering based video image/video decoding method and FIG. 7 schematically shows a filtering unit in a decoding apparatus.
Figure 7:
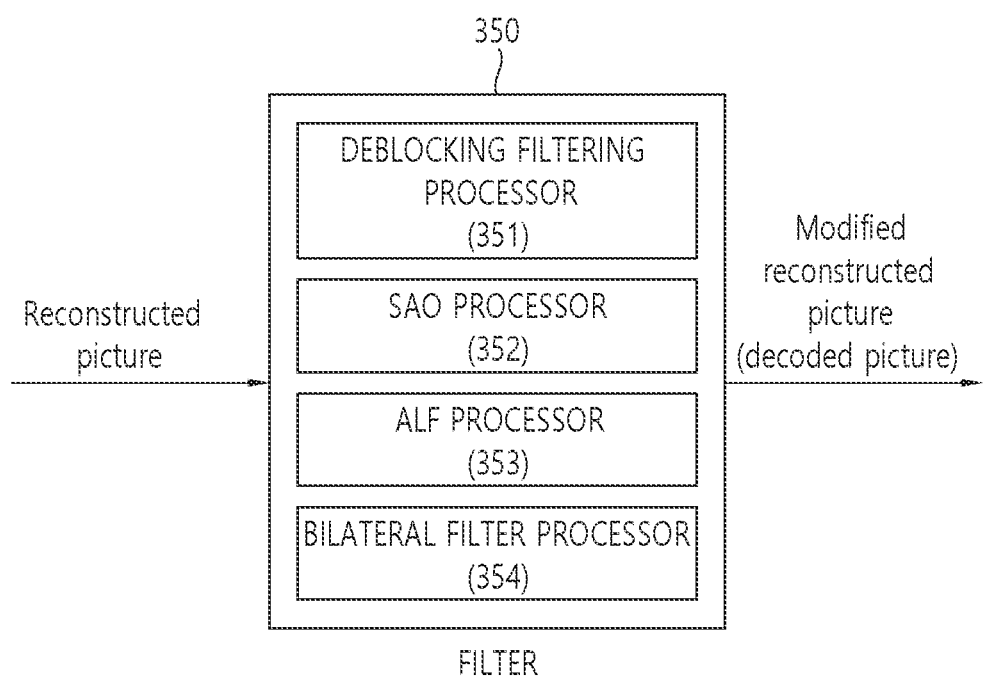

FIG. 6 schematically illustrates an in-loop filtering based video image/video decoding method and FIG. 7 schematically illustrates a filter in a decoding apparatus. The filter in the decoding apparatus of FIG. 7 may be the same as or corresponding to the filter 350 of the decoding apparatus 300 of FIG. 3 described above. Further, the decoding apparatus may perform an operation corresponding to the operation performed by the encoding apparatus.

Referring to FIG. 6 and FIG. 7, the decoding apparatus may obtain image information including information for picture reconstruction and (in-loop) filtering related information from a received bitstream (S600). S600 may be performed by the entropy decoder 310 of the decoding apparatus. The information for picture reconstruction may include partitioning information, prediction information, residual information, and the like, which have been described above/will be described later. The filtering related information may include, for example, flag information indicating whether to apply entire in-loop filtering, flag information indicating whether each filtering procedure is applied, information on SAO type, information on an SAO offset value, information on the location of an SAO band, information on an ALF filtering shape, information on an ALF filtering coefficient, information on a bilateral filter shape, and/or information on a bilateral filter weight. Detailed filtering related information will be described later. Meanwhile, when some filtering methods are omitted as described above, information (parameters) on the omitted filtering methods may be omitted.

The decoding apparatus generates a reconstructed picture for the current picture based on the information for picture reconstruction (S610). As described above with reference to FIG. 3, the decoding apparatus may generate a reconstructed picture through procedures such as intra/inter prediction and residual processing for the current picture. Specifically, the decoding apparatus generates prediction samples for the current block through intra or inter prediction based on prediction information included in the information for picture reconstruction and derives residual samples for the current block based on residual information included in the information for picture reconstruction (based on dequantization/inverse transformation). The decoding apparatus may generate a reconstructed block including reconstructed samples for the current block based on the prediction samples and the residual samples. A reconstructed picture may be generated based on the reconstructed block.

The decoding apparatus performs an in-loop filtering procedure on the reconstructed picture (S620). A modified reconstructed picture may be generated through the in-loop filtering procedure. The modified reconstructed picture may be output and/or stored in the decoded picture buffer 360 or memory as a decoded picture, and may be used as a reference picture in an inter prediction procedure at the time of decoding a picture thereafter. The in-loop filtering procedure may include a deblocking filtering procedure, a sample adaptive offset (SAO) procedure, an adaptive loop filter (ALF) procedure, and/or a bi-lateral filter procedure. S620 may be performed by the filter 350 of the decoding apparatus. Specifically, for example, the deblocking filtering procedure may be performed by the deblocking filtering processor 351, the SAO procedure may be performed by the SAO processor 352, the ALF procedure may be performed by the ALF processor 353, and the bilateral filter procedure may be performed by the bilateral filter processor 354. Some of the aforementioned various filtering procedures may be omitted in consideration of image characteristics, complexity, efficiency, and the like, and in this case, related components in FIG. 7 may also be omitted.

Meanwhile, as described above, the encoding apparatus/the decoding apparatus may reconstruct the picture in units of block. If the image is reconstructed in units of block, a block distortion may occur in a boundary between the blocks in the reconstructed picture. Therefore, the encoding apparatus and the decoding apparatus may use the deblocking filter to remove the block distortion occurring in the boundary between the blocks in the reconstructed picture. The deblocking filter procedure may for example, derive a target boundary in the reconstructed picture, determine a boundary strength (bs) for the target boundary, and perform the deblocking filtering for the target boundary based on the bs. The bs may be determined based on prediction modes of two blocks adjacent to the target boundary, a difference between the motion vectors thereof, whether the reference pictures thereof are the same, and whether a non-zero significant coefficient exists therein.

Figure 8:
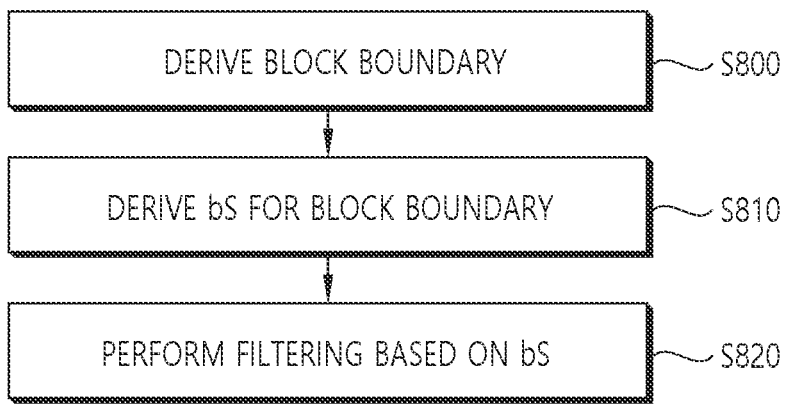
FIG. 8 shows an embodiment of a method of performing deblocking filtering.

FIG. 8 exemplarily illustrates an exemplary embodiment of a method for performing the deblocking filter process. The method illustrated in FIG. 8 may be performed by the aforementioned filter 260 in the encoding apparatus illustrated in FIG. 2 and the aforementioned filter 350 in the decoding apparatus illustrated in FIG. 3.

Referring to FIG. 8, the encoding apparatus/the decoding apparatus may derive the boundary between the blocks on which the deblocking filtering is performed in the reconstructed picture (S800). Meanwhile, the boundary on which the deblocking filtering is performed may be referred to as an edge. Further, the boundary on which the deblocking filtering is performed may include two types, and the two types may be a vertical boundary and a horizontal boundary. The vertical boundary may be referred to as a vertical edge, and the horizontal boundary may be referred to as a horizontal edge. The encoding apparatus/the decoding apparatus may perform the deblocking filtering for the vertical edge, and perform the deblocking filtering for the horizontal edge.

When performing the deblocking filtering for one direction (i.e., the deblocking filtering for the vertical boundary or the deblocking filtering for the horizontal boundary), the encoding apparatus/the decoding apparatus may derive a transform block boundary. The encoding apparatus/the decoding apparatus may derive a coding subblock boundary.

The encoding apparatus/the decoding apparatus may derive the block boundary on which the deblocking filtering is performed based on a grid of an N×N size. For example, the encoding apparatus/the decoding apparatus may derive the block boundary on which the deblocking filtering is performed based on whether the boundary of the block (the transform block or the coding subblock) corresponds to the grid of the N×N size. In other words, for example, the encoding apparatus/the decoding apparatus may derive the block boundary on which the deblocking filtering is performed based on whether the boundary of the block (the transform block or the coding subblock) is the block boundary positioned on the grid of the N×N size. The encoding apparatus/the decoding apparatus may derive the boundary of the block corresponding to the grid of the N×N size as the block boundary on which the deblocking filtering is performed. Here, the grid of the N×N size may mean a boundary derived by splitting the reconstructed picture into a square of the N×N size. The grid of the N×N size may be, for example, a grid of a 4×4 or 8×8 size.

The encoding apparatus/the decoding apparatus may determine the boundary strength (bs) of the boundary on which the deblocking filtering is performed (S810). The bs may also be referred to as a boundary filtering strength.

The encoding apparatus/the decoding apparatus may determine the bs based on the blocks adjacent to the boundary on which the deblocking filtering is performed. For example, a case of obtaining the bs value of the boundary (block edge) between a block P and a block Q may be assumed. In this case, the encoding apparatus/the decoding apparatus may determine the bs value of the boundary based on information about positions of the block P and the block Q and/or whether the block P and the block Q are coded in the intra mode.

Here, the block P may represent a block including a p0 sample adjacent to the boundary on which the deblocking filtering is performed, and the block Q may represent a block including a q0 sample adjacent to the boundary on which the deblocking filtering is performed.

For example, the p0 may represent a sample of a block adjacent to a left or a top of the boundary on which the deblocking filtering is performed, and the q0 may represent a sample of a block adjacent to a right or a bottom of the boundary on which the deblocking filtering is performed. As an example, if a direction of the filtering boundary is a vertical direction (i.e., if the filtering boundary is the vertical boundary), the p0 may represent the sample of the block adjacent to the left of the boundary on which the deblocking filtering is performed, and the q0 may represent the sample of the block adjacent to the right of the boundary on which the deblocking filtering is performed. Alternatively, as another example, if the direction of the filtering boundary is a horizontal direction (i.e., if the filtering boundary is the horizontal boundary), the p0 may represent the sample of the block adjacent to the top of the boundary on which the deblocking filtering is performed, and the q0 may represent the sample of the block adjacent to the bottom of the boundary on which the deblocking filtering is performed.

The encoding apparatus/the decoding apparatus may perform the deblocking filtering based on the bs (S820).

For example, the encoding apparatus/the decoding apparatus may determine whether the filtering process for all block boundaries in the reconstructed picture is performed, and if the filtering process for all block boundaries is not performed, the encoding apparatus/the decoding apparatus may determine whether the position of the boundary of the subblock corresponds to the grid of the N×N size (e.g., 8×8 grid). For example, it may be determined whether a remainder derived by dividing the x component and the y component of the boundary position of the subblock by an N is 0. If the remainder derived by dividing the x component and the y component of the position of the boundary of the subblock by the N is 0, the position of the boundary of the subblock may correspond to the grid of the N×N size. If the position of the boundary of the subblock corresponds to the grid of the N×N size, the encoding apparatus/the decoding apparatus may perform the deblocking filtering on the boundary based on the bs of the boundary.

Meanwhile, based on the determined bs value, the encoding apparatus/the decoding apparatus may determine a filter applied to the boundary between the blocks. The filter may be divided into a strong filter and a weak filter. The encoding apparatus/the decoding apparatus may perform the filtering for a boundary at a position at which the block distortion is highly likely to occur in the reconstructed picture and a boundary at a position at which the block distortion is less likely to occur therein with different filters, thereby enhancing coding efficiency.

The encoding apparatus/the decoding apparatus may perform the deblocking filtering on the boundary between the blocks using the determined filter (e.g., the strong filter or the weak filter). If the deblocking filtering processes for all of the boundaries between the blocks in the reconstructed picture are performed, the deblocking filtering process may be terminated.

Meanwhile, the present disclosure proposes a method of determining a filter length based on a distance between edges in the process of performing deblocking filtering. That is, it is possible to improve subjective image quality and simplify a filter length determination method compared to the same complexity, thereby simplifying a hardware (H/W) design process.

In the current VVC, a filter length is determined based on conditions for the boundary of a transform block (the edge of a transform block or a transform edge) and can be modified for the boundary of a prediction block (the edge of a prediction block or a prediction edge). In this process, the filter length may be determined according to conditions for neighboring edges.

Meanwhile, in the present disclosure, the filter length may indicate the number of samples applied to a block P and a block Q based on a block boundary (i.e., a target boundary). For example, when the target boundary is a vertical boundary, a filter length P may indicate the number of samples (the number of luma/chroma samples) applied to the block P adjacent to the left of the target boundary and a filter length Q may indicate the number of samples (the number of luma/chroma samples) applied to the block Q adjacent to the right of the target boundary. When the target boundary is a horizontal boundary, the filter length P may indicate the number of samples (number of luma/chroma samples) applied to the block P adjacent to the upper side of the target boundary and the filter length Q may indicate the number of samples (number of luma/chroma samples) applied to the block Q adjacent to the lower side of the target boundary.

Figure 9:
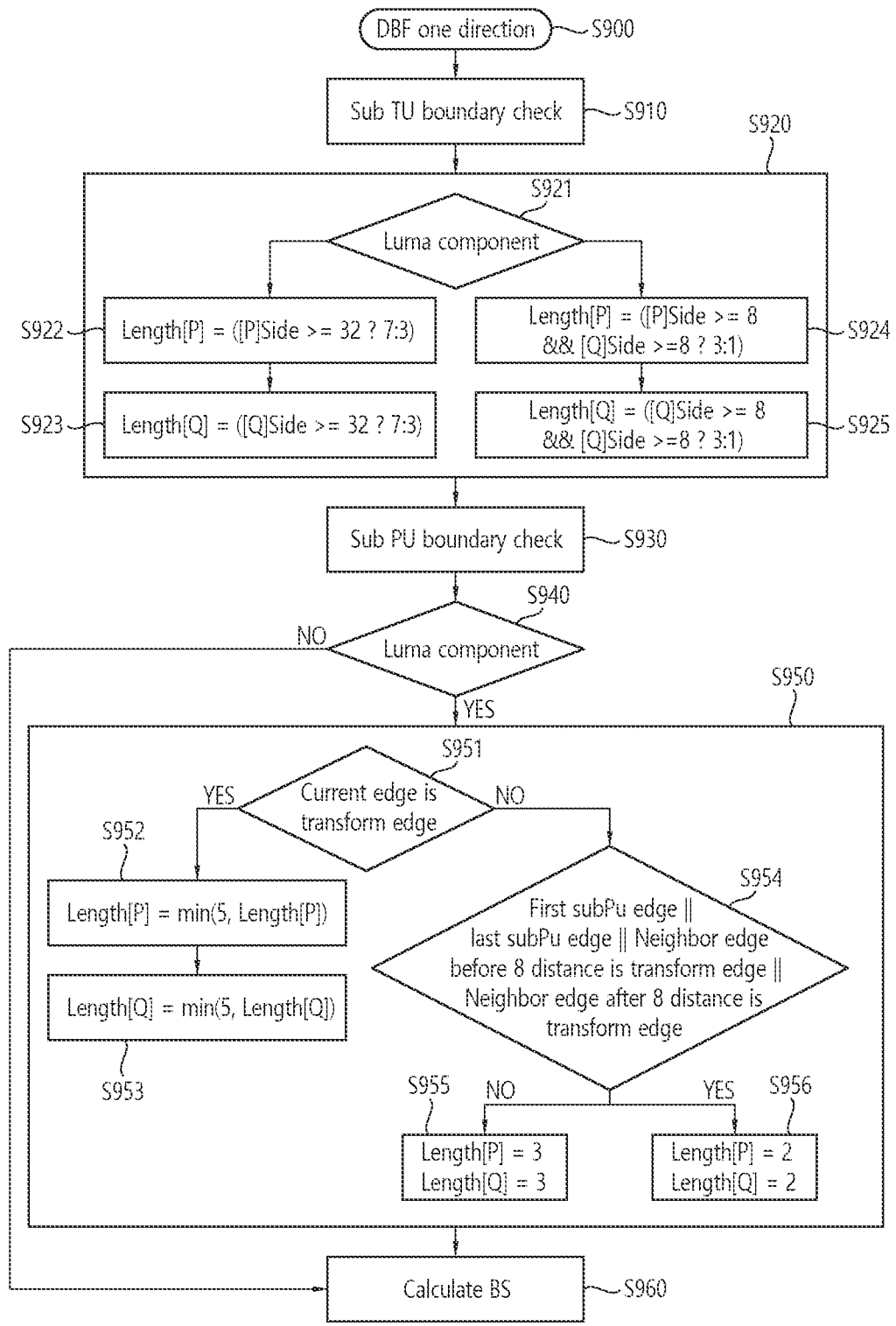
FIG. 9 shows an example of a method of determining a filter length based on conditions for neighboring edges.

FIG. 9 shows an example of a method of determining a filter length based on conditions for neighboring edges.

Referring to FIG. 9, the encoding apparatus/decoding apparatus may perform deblocking filtering in one direction (i.e., deblocking filtering on a vertical boundary or deblocking filtering on a horizontal boundary) (S900).

The encoding apparatus/decoding apparatus may derive a transform block (or sub-transform block; sub-TU) boundary (S910) and determine a filter length based on conditions for the transform block boundary (S920).

For example, the encoding apparatus/decoding apparatus may determine the filter length based on blocks P and Q adjacent to the transform block boundary (i.e., the transform block boundary on which deblocking filtering is performed). First, the encoding apparatus/decoding apparatus may determine whether the transform block is a luma component or a chroma component (S921). When the transform block is the luma component, the encoding apparatus/decoding apparatus may determine the filter length P as 7 if the size of the transform block P side is 32 or more and determine the filter length P as 3 if the size of the transform block P side is less than 32 (S922). In addition, when the transform block is the luma component, the encoding apparatus/decoding apparatus may determine the filter length Q as 7 if the size of the transform block Q side is 32 or more and determine the filter length Q as 3 if the size of the transform block Q side is less than 32 (S923). When the transform block is the chroma component, the encoding apparatus/decoding apparatus may determine the filter length P and the filter length Q as 3 if the size of the transform block P side is 8 or more and the size of the transform block Q side is 8 or more and determine the filter length P and the filter length Q as 1 if not (S924 and S925).

The encoding apparatus/decoding apparatus may derive a prediction block (or sub-prediction block; sub-PU) boundary (S930) and determine whether the prediction block is a luma component or a chroma component (S940). Then, the encoding apparatus/decoding apparatus may determine a filter length based on conditions for the prediction block boundary (S950).

When the prediction block is a luma component, the encoding apparatus/decoding apparatus may determine whether a current target boundary (i.e., the prediction block boundary) is a transform block boundary (SS951).

When the current target boundary is the same as the transform block boundary, the encoding apparatus/decoding apparatus may determine the filter length P and the filter length Q for the prediction block boundary based on the filter lengths P and Q derived based on the transform block boundary. For example, the filter length P may be determined as the smaller value of 5 and the filter length P derived based on the transform block boundary (S952), and the filter length Q may be determined as a smaller value of 5 and the filter length Q derived based on the transform block boundary (S953).

When the current target boundary is not the transform block boundary, the encoding apparatus/decoding apparatus may determine the filter length P and the filter length Q as 3 or 2 based on the condition for the prediction block boundary. For example, the filter length may be determined based on whether the first sub-PU boundary, the last sub-PU boundary, or a neighboring boundary (previous or subsequent neighboring boundary separated by a distance of 8) is the transform boundary (S954). The encoding apparatus/decoding apparatus may determine the filter length P and the filter length Q as 3 if at least one of the aforementioned conditions is satisfied (S955) and determine the filter length P and the filter length Q as 2 if not (S956).

When the prediction block is a chroma component or after step S950, the encoding apparatus/decoding apparatus may determine a boundary strength (bS) for the target boundary (S960).

Figure 10:
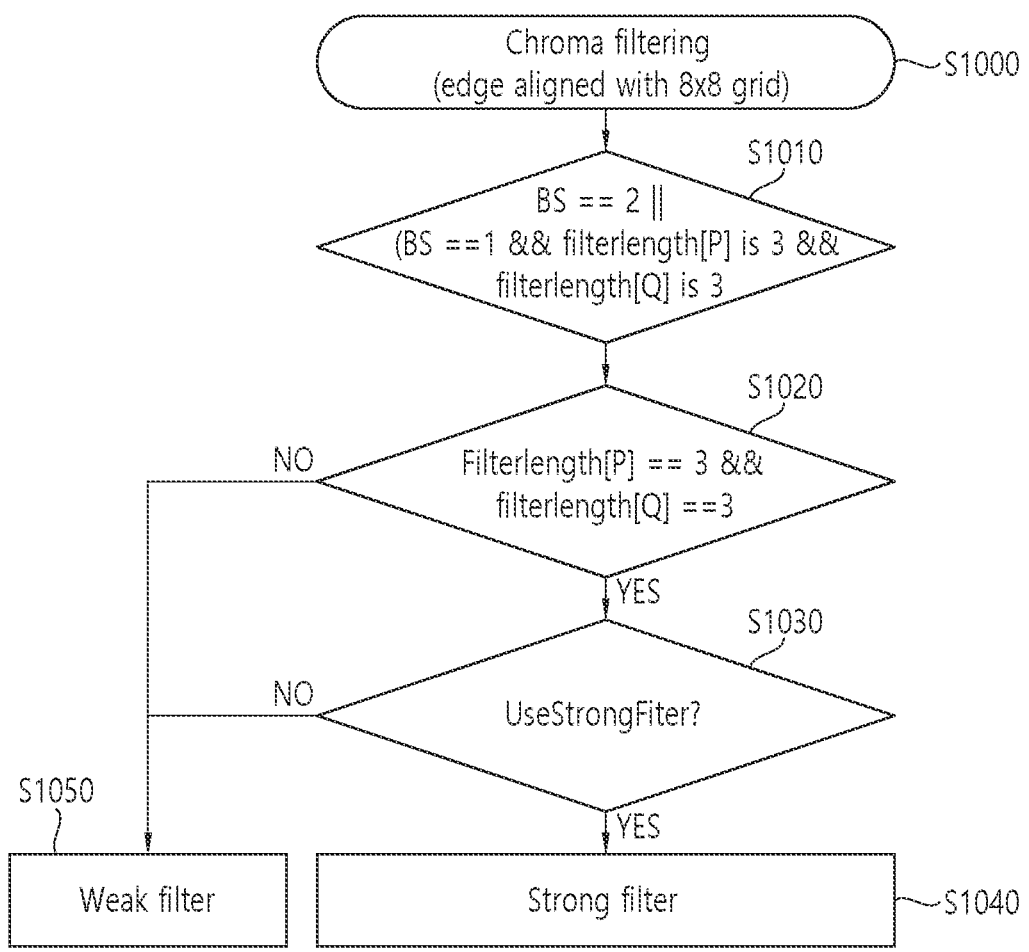
FIG. 10 shows an example of a method of performing deblocking filtering based on filtering conditions for a boundary of a chroma component.

FIG. 10 shows an example of a method of performing deblocking filtering based on filtering conditions for the boundary of a chroma component.

Referring to FIG. 10, the encoding apparatus/decoding apparatus may perform deblocking filtering on the chroma component (S1000). Here, the boundary may be a boundary for the chroma component arranged in an N×N grid and, for example, the N×N grid may be the grid of an 8×8 size. For example, the encoding apparatus/decoding apparatus may derive a target boundary based on whether the boundary for the chroma component corresponds to an N×N grid and may perform the following process on the target boundary.

The encoding apparatus/decoding apparatus may determine whether 1) bS is 2 or 2) bS is 1, the filter length P is 3, and the filter length Q is 3 (S1010). Further, when 1) or 2) is satisfied, the encoding apparatus/decoding apparatus may determine whether the filter length P is 3 and the filter length Q is 3 (S1020).

When all of the aforementioned conditions are satisfied, the encoding apparatus/decoding apparatus may determine whether to use a strong filter or a weak filter (S1030). For example, the encoding apparatus/decoding apparatus may determine whether to use a strong filter or a weak filter based on the bS value. When it is determined to use the strong filter, the encoding apparatus/decoding apparatus may perform deblocking filtering on the boundary between blocks using the strong filter (S1040). When it is determined to use the weak filter, the encoding apparatus/decoding apparatus may perform deblocking filtering on the boundary between blocks using the weak filter (S1050).

When the conditions of steps S1010 to S1020 are not satisfied, the encoding apparatus/decoding apparatus may use a weak filter (S1050).

As described above, deblocking filtering on the boundary of a chroma component is performed at an edge that satisfies the following two conditions, and a strong filter is applied to the edge when the filter length is 3.
1. When the boundary strength (bS) is 2
2. When the boundary strength (bS) is 1 and the filter length is 3

As described above with reference to FIG. 9 and FIG. 10, in determining a filter length in the deblocking filtering process, complexity may increase and performance may deteriorate because the filter length is determined based on conditions for each of the transform block boundary and the prediction block boundary. Accordingly, the present disclosure proposes a method of determining a filter length more effectively in performing deblocking filtering.

According to an embodiment of the present disclosure, a filter length may be determined only by a distance between neighboring edges. Here, a distance may refer to the number of samples (i.e., pixels).

In an embodiment, a filter length for a luma component may be determined as follows.
When the distance on the side of the block Q is less than or equal to 4, the filter length may be set equal to 0.
Otherwise, if the distance on the side of each block (block Q, block P) is less than or equal to 8, the filter length may be set equal to 3.
Otherwise, if the distance on the side of each block (block Q, block P) is less than or equal to 16, the filter length may be set equal to 5.
Otherwise, the filter length may be set equal to 7.

Alternatively, as an embodiment, a filter length for a chroma component may be determined as follows.
When the distance on the side of the block Q side is less than or equal to 2, the filter length may be set equal to 0.
Otherwise, if the distance on the side of each block (block Q, block P) is less than or equal to 4, the filter length may be set equal to 1.
Otherwise, the filter length may be set equal to 3.

Alternatively, as an embodiment, distance conditions for determining a filter length may be adaptively applied in order to support various color formats. For example, a chroma filter length for 4:4:4 chroma format may be adaptively applied as follows.
When the distance on the side of the block Q is less than or equal to 4, the filter length may be set equal to 0.
Otherwise, if the distance on the side of each block (block Q, block P) is less than or equal to 8, the filter length may be set equal to 1.
Otherwise, the filter length may be set equal to 3.

Figure 11:
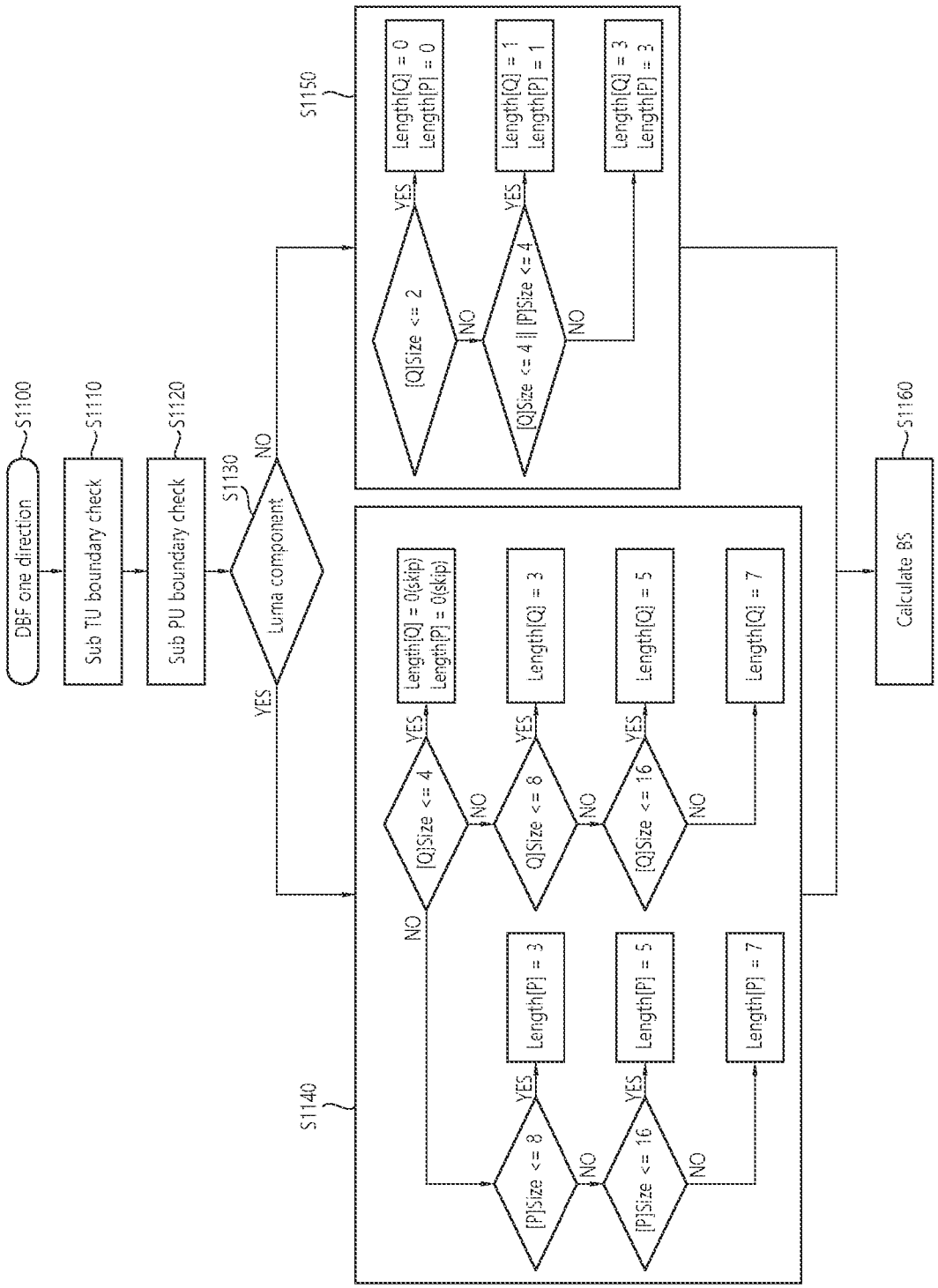
FIG. 11 shows an example of a method of determining a filter length according to an embodiment of the present disclosure.

FIG. 11 shows an example of a method of determining a filter length according to an embodiment of the present disclosure.

Referring to FIG. 11, the encoding apparatus/decoding apparatus may perform deblocking filtering on one direction (i.e., deblocking filtering on a vertical boundary or deblocking filtering on a horizontal boundary) (S1100).

The encoding apparatus/decoding apparatus may derive a transform block (or sub-transform block; sub-TU) boundary (S1110) and may derive a prediction block (or sub-prediction block; sub-PU) boundary (S1120). Then, the encoding apparatus/decoding apparatus may determine whether components of the blocks are luma or chroma (S1130).

If the block component is the luma component, the encoding/decoding apparatus may determine a filter length (e.g., 0, 3, 5, or 7) based on a distance between neighboring edges (e.g., less than or equal to 4, 8, or 16) (S1140).

For example, the encoding apparatus/decoding apparatus may determine whether the size of a block Q side is 4 or less. In other words, the encoding apparatus/decoding apparatus may determine whether the distance (number of samples) of the block Q is 4 or less with respect to a target edge. If this condition is satisfied, filter lengths P and Q can be determined as 0. In this case, when the filter lengths are set to 0, it may indicate that filtering can be skipped (omitted).

If the condition that the size of the block Q side is 4 or less is not satisfied, the encoding apparatus/decoding apparatus may determine a filter length based on the sizes of the blocks P and Q, respectively. For example, the encoding apparatus/ decoding apparatus may determine whether the size of the block P side (or the block Q side) is 8 or less. That is, the encoding apparatus/decoding apparatus may determine whether the distance (number of samples) of the block P (or the block Q) is 8 or less with respect to the target edge, and when this condition is satisfied, the encoding apparatus/decoding apparatus may determine filter length P (or filter length Q) as 3.

When the condition that the size of the block P side (or the block Q side) is 8 or less is not satisfied, the encoding apparatus/decoding apparatus may determine whether the size of the block P side (or the block Q side) is 16 or less. That is, the encoding apparatus/decoding apparatus may determine whether the distance (number of samples) of the block P (or the block Q) is 16 or less with respect to the target edge, and when this condition is satisfied, the encoding apparatus/decoding apparatus may determine the filter length P (or filter length Q) as 5. However, if this condition is not satisfied, the filter length P (or filter length Q) may be determined as 7.

If the block component is the chroma component, the encoding apparatus/decoding apparatus may determine a filter length (e.g., 0, 1, or 3) based on the distance between neighboring edges (e.g., less than or equal to 2 or 4) (S1150).

For example, the encoding apparatus/decoding apparatus may determine whether the size of the block Q side is 2 or less. In other words, the encoding apparatus/decoding apparatus may determine whether the distance (number of samples) of the block Q is 2 or less with respect to the target edge. If this condition is satisfied, the filter length P and the filter length Q may be determined as 0. In this case, when the filter lengths are set to 0, it may indicate that filtering can be skipped (omitted).

When the condition that the size of the block Q side is 2 or less is not satisfied, the encoding apparatus/decoding apparatus may determine the filter lengths based on the sizes of the blocks P and Q, respectively. For example, the encoding apparatus/decoding apparatus may determine whether the size of the block P side (or the block Q side) is 4 or less. That is, the encoding apparatus/decoding apparatus may determine whether the distance (number of samples) of the block P (or the block Q) is 4 or less with respect to the target edge, and when this condition is satisfied, the encoding apparatus/decoding apparatus may determine the filter length P (or the filter length Q) as 1. However, if this condition is not satisfied, the filter length P (or filter length Q) may be determined as 3.

The encoding apparatus/decoding apparatus may determine a boundary strength (bS) for the target boundary (S1160). Further, the encoding apparatus/decoding apparatus may determine whether to apply a strong filter or a weak filter based on bS and perform deblocking filtering.

Figure 12:
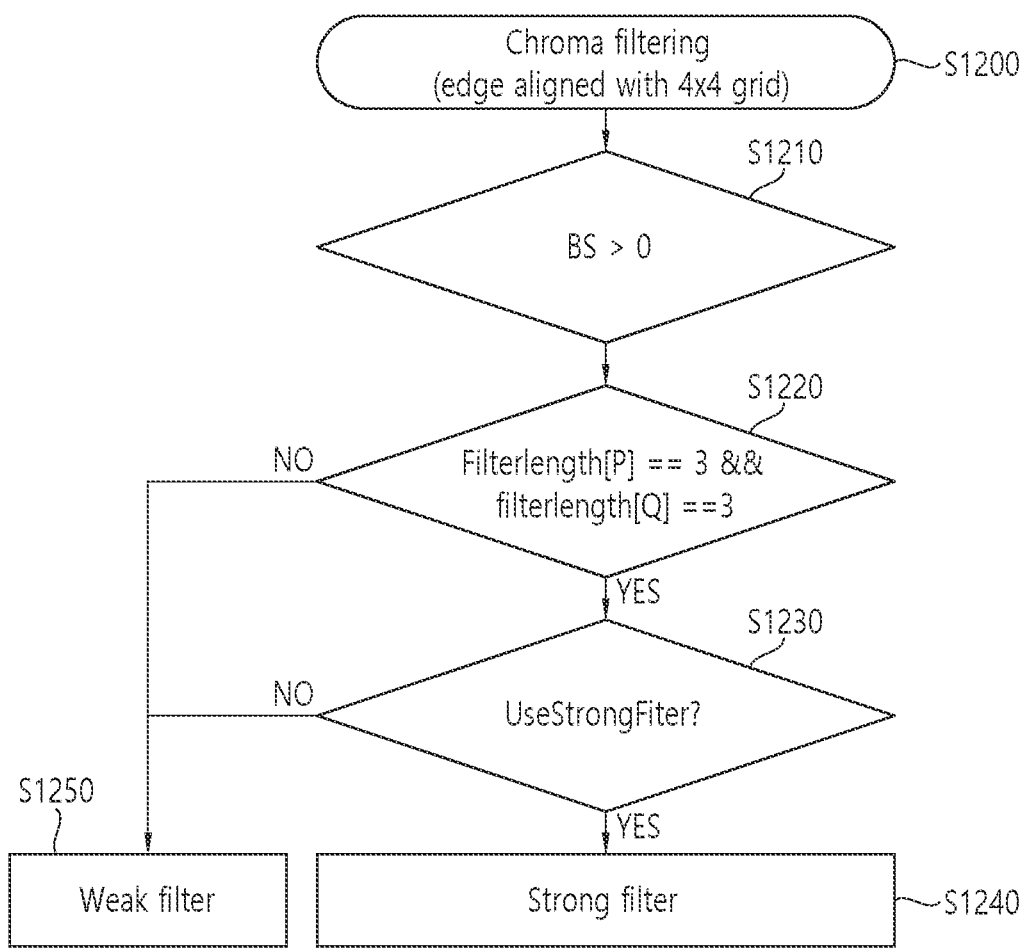
FIG. 12 shows an example of a method of performing deblocking filtering based on filtering conditions for a boundary of a chroma component according to an embodiment of the present disclosure.

FIG. 12 shows an example of a method of performing deblocking filtering based on a filtering condition for a boundary of a chroma component according to an embodiment of the present disclosure.

Referring to FIG. 12, the encoding apparatus/decoding apparatus may perform deblocking filtering on the chroma component (S1200). In this case, the boundary may be a boundary for the chroma component arranged in an N×N grid, and the N×N grid may be, for example, a grid of 4×4 size. For example, the encoding apparatus/decoding apparatus may derive a target boundary based on whether it corresponds to an N×N grid and may perform the following process on the target boundary.

The encoding apparatus/decoding apparatus may determine whether bS is greater than 0 (S1210). When bS is greater than 0, the encoding apparatus/decoding apparatus may determine whether the filter length P is 3 and the filter length Q is 3 (S1220).

When the filter length P is 3 and the filter length Q is 3, the encoding apparatus/decoding apparatus may determine whether to use a strong filter or a weak filter (S1230). For example, the encoding apparatus/decoding apparatus may determine whether to use a strong filter or a weak filter based on the bS value.

When it is determined to use the strong filter, the encoding apparatus/decoding apparatus may perform deblocking filtering on the boundary between blocks using the strong filter (S1240). When it is determined to use the weak filter, the encoding apparatus/decoding apparatus may perform deblocking filtering on the boundary between blocks using the weak filter (S1250).

When the condition that the filter length P is 3 and the filter length Q is 3 is not satisfied, the encoding apparatus/decoding apparatus may use a weak filter (S1250).

As described above, according to an embodiment of the present disclosure, edge filtering for a chroma component may be performed only when the boundary strength bS is not 0. Accordingly, since the process of checking the condition can be simplified as compared to conventional methods, complexity can be reduced and performance can be improved.

In addition, the deblocking filtering process proposed in the present disclosure may support the following functions.

Aligned filtering boundary between luma and chroma component

Uniform filter length

Parallel processing

Figure 13:
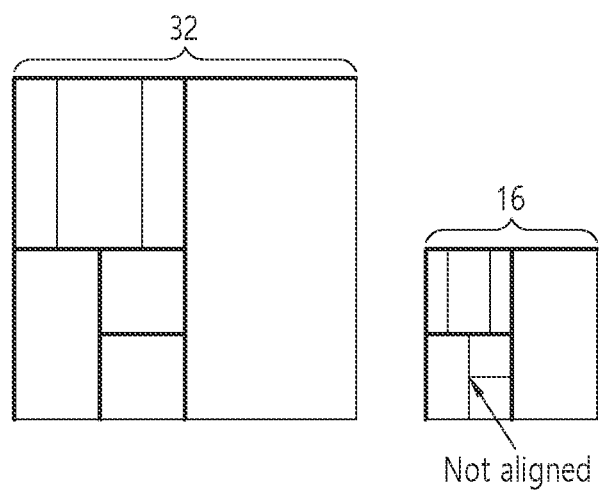
FIG. 13 and FIG. 14 are exemplary diagrams illustrating an aligned filtering boundary between a luma component and a chroma component.
Figure 13:
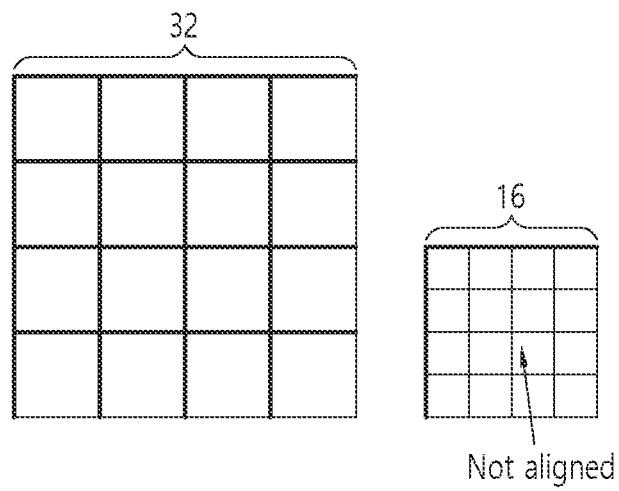
Figure 14:
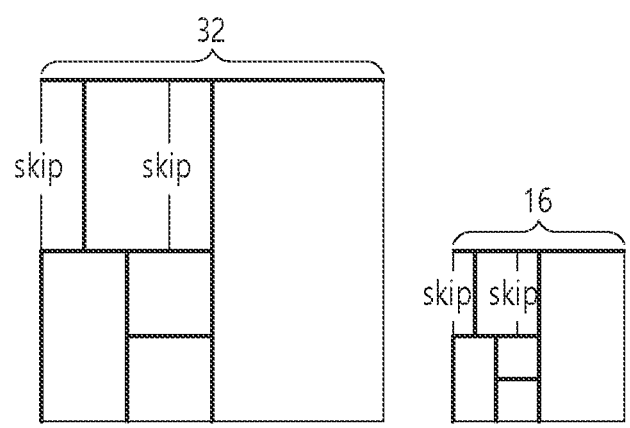
Figure 14:
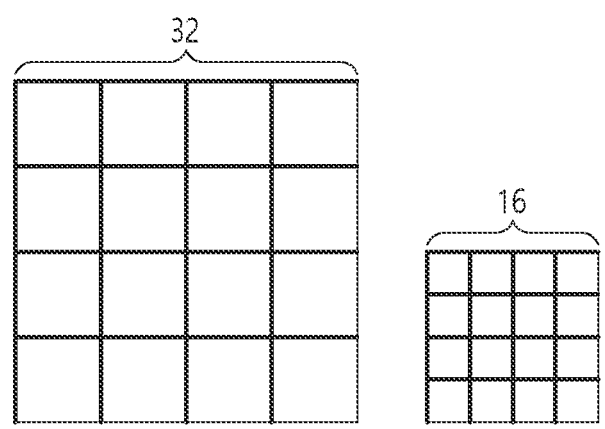

FIG. 13 and FIG. 14 are exemplary diagrams illustrating an aligned filtering boundary between a luma component and a chroma component.

As described above, in a conventional deblocking filtering process, filtering is performed on an 8×8 sample grid for both luma and chroma components at a block boundary in consideration of the following conditions.

Transform block (TU) edge and prediction block (PU) edge

Prediction block (PU) edge excluding sub-partitioned chroma prediction block (PU) edge In this case, consequently, the filtered edges between the luma and chroma components are not aligned as in FIG. 13.

As an example, (a) of FIG. 13 represents coding tree units partitioned according to a quad-tree binary-tree ternary-tree (QTBTTT) structure and represents coding tree units of a luma component having a size of 32×32 and a chroma component having a size of 16×16, respectively. As shown in (a) of FIG. 13, edges (parts indicated by thick solid lines) on which filtering has been performed on the luma component having the size of 32×32 and the chroma component having the size of 16×16 are represented. In this case, it can be ascertained that the filtered edges between the luma component having the size of 32×32 and the chroma component having the size of 16×16 are different from each other when the above-described conventional deblocking filtering is applied.

Alternatively, (b) of FIG. 13 represents a 32×32 subblock-based temporal motion vector predictor (SbTMVP) coded block and represents a block of a luma component having a size of 32×32 and a block of a chroma component having a size of 16×16. As shown in (b) of FIG. 13, edges (parts indicated by thick solid lines) on which filtering has been performed on the luma component having the size of 32×32 and the chroma component having the size of 16×16 are represented. In this case, it can be ascertained that the filtered edges between the luma component having the size of 32×32 and the chroma component having the size of 16×16 are different from each other when the above-described conventional deblocking filtering is applied.

In the deblocking filtering process according to an embodiment of the present disclosure, filtering is performed using a grid (e.g., a 4×4 sample grid) in which edges between a luma component and a chroma component are dense. In this case, the filtered edges between the luma component and the chroma component may be aligned as in FIG. 14.

As an example, (a) of FIG. 14 represents coding tree units partitioned according to a quad-tree binary-tree ternary-tree (QTBTTT) structure and represents coding tree units of a luma component having a size of 32×32 and a chroma component having a size of 16×16, respectively. As shown in (a) of FIG. 14, edges (parts indicated by thick solid lines) on which filtering has been performed on the luma component having the size of 32×32 and the chroma component having the size of 16×16 are represented. In this case, it can be ascertained that the filtered edges between the luma component having the size of 32×32 and the chroma component having the size of 16×16 coincide with each other when the deblocking filtering process proposed in the present disclosure is applied.

Alternatively, (b) of FIG. 14 represents a 32×32 subblock-based temporal motion vector predictor (SbTMVP) coded blocks and represents a block of a luma component having a size of 32×32 and a block of a chroma component having a size of 16×16. As shown in (b) of FIG. 14, edges (parts indicated by thick solid lines) on which filtering has been performed on the luma component having the size of 32×32 and the chroma component having the size of 16×16 are represented. In this case, it can be ascertained that the filtered edges between the luma component having the size of 32×32 and the chroma component having the size of 16×16 coincide with each other when the deblocking filtering process proposed in the present disclosure is applied.

Figure 15:
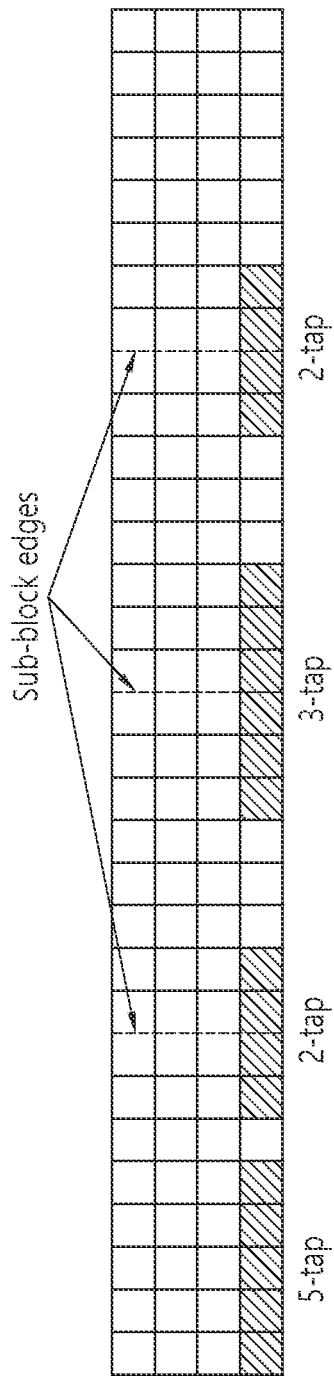
FIG. 15 and FIG. 16 are exemplary diagram illustrating a uniform filter length.
Figure 16:
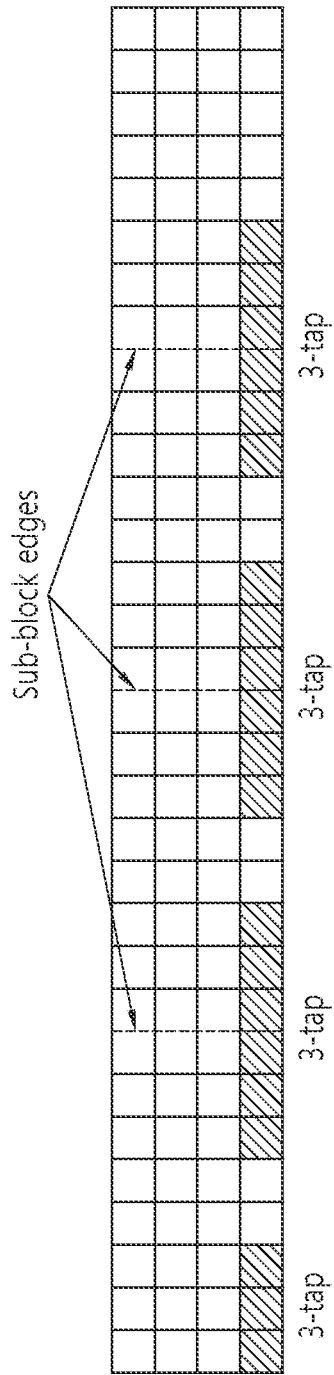

FIG. 15 and FIG. 16 are exemplary diagrams illustrating a uniform filter length.

As described above, in the conventional deblocking filtering process, a filter length is determined by a neighboring TU edge distance and a neighboring PU edge distance. Therefore, different filter lengths may be derived even when the edges have the same property.

As an example, FIG. 15 shows an example in which different filter lengths are applied in the conventional deblocking filtering process described above. FIG. 15 shows a 32×N block partitioned into subblocks when subblock prediction is applied, and it can be ascertained that different filter lengths are applied to vertical boundaries. For example, filter lengths of 2, 3, and 5 taps (i.e., 2 samples, 3 samples, and 5 samples) may be applied to each of subblock edges.

In the deblocking filtering process according to an embodiment of the present disclosure, a filter length is determined only by a distance, and thus a uniform filter length can always be derived.

As an example, FIG. 16 shows an example in which the same filter length is applied in deblocking filtering according to an embodiment of the present disclosure. FIG. 16 shows a 32×N block partitioned into subblocks when subblock prediction is applied, and it can be ascertained that the same filter length is applied to vertical boundaries. For example, a filter length of 3 taps (i.e., 3 samples) may be applied to each of subblock edges.

Figure 17:
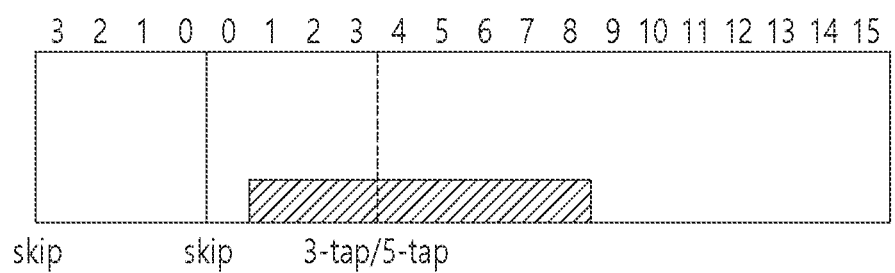
FIG. 17 is an exemplary diagram illustrating a parallel processing function in a deblocking filtering process.
Figure 17:
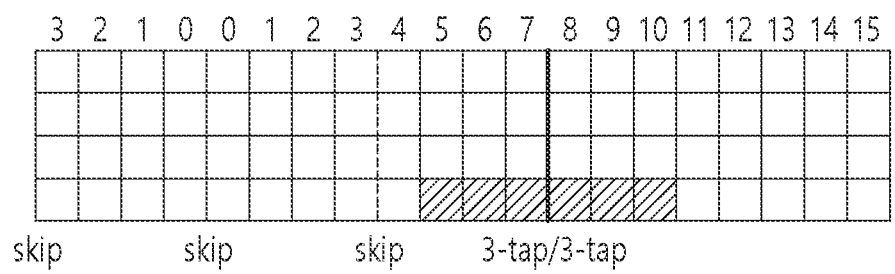

FIG. 17 is an exemplary diagram illustrating a parallel processing function in the deblocking filtering process.

In order to support the parallel processing property, a filtering operation for block edges on a narrow distance between neighboring edges may be skipped (omitted). For example, as shown in (a) and (b) of FIG. 17, since narrow edges are generated (that is, a case where the distance between neighboring edges is narrow occurs), the filtering process for these edges can be skipped (omitted). For example, when the size of the block Q side is greater than 4, filtering may be performed.

The following drawings have been created to explain a specific example of the present disclosure. The specific names of devices or specific terms or names (e.g., the names of syntax/syntax elements, etc.) described in the drawings are provided by way of example, so that the technical features of the present disclosure are not limited to the specific names used in the drawings below.

Figure 18:
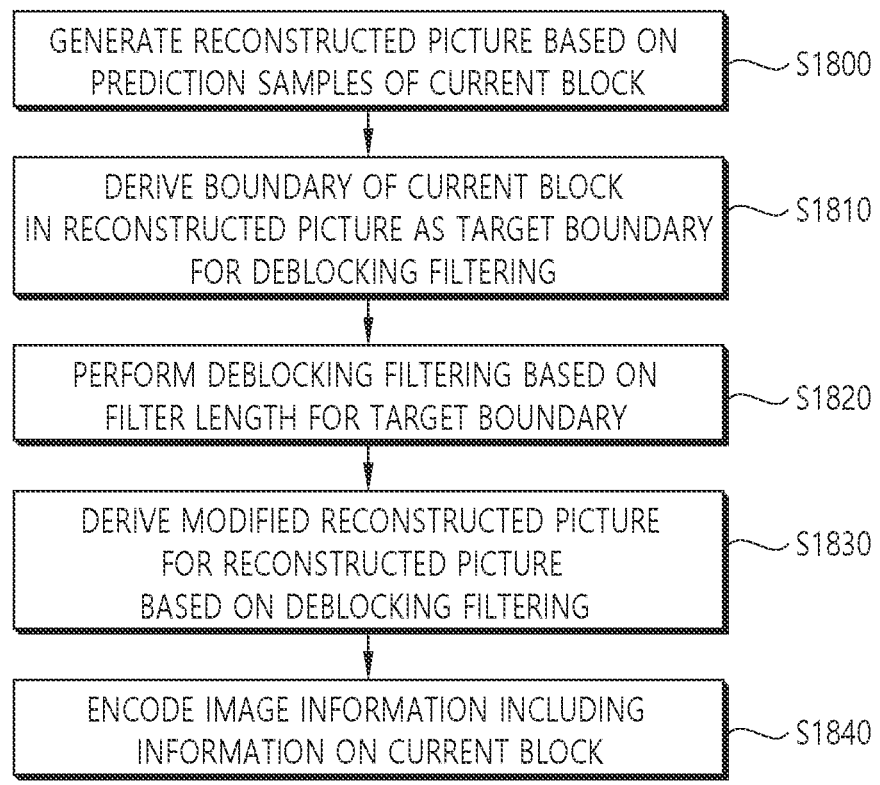
FIG. 18 and FIG. 19 schematically show an example of a video/image encoding method and related components according to embodiment(s) of the present disclosure.
Figure 19:
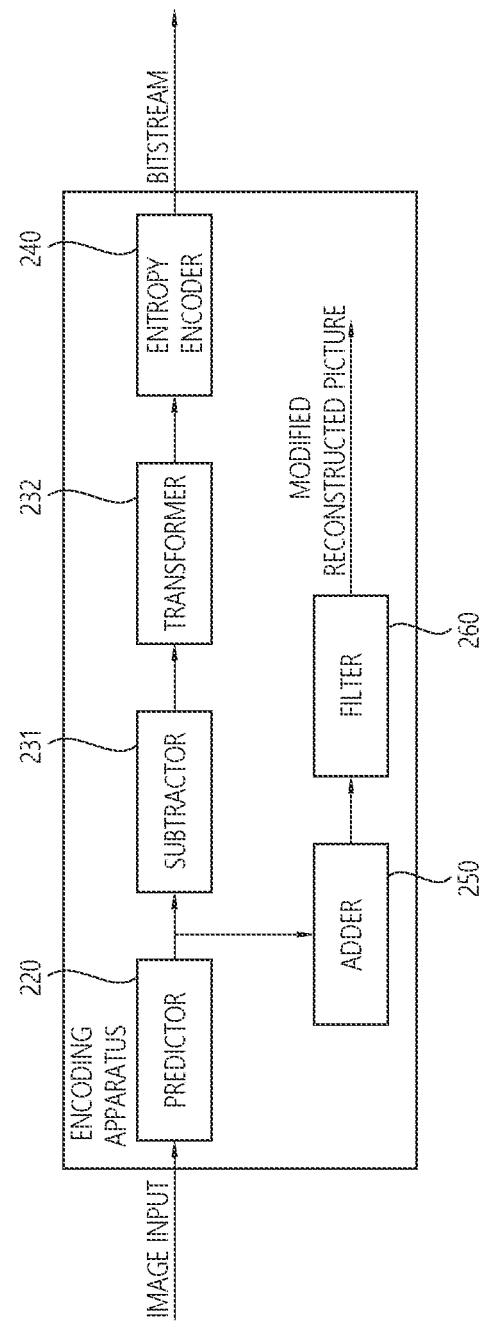

FIG. 18 and FIG. 19 schematically show an example of a video/image encoding method and related components according to embodiment(s) of the present disclosure.

The method illustrated in FIG. 18 may be performed by the encoding apparatus 200 illustrated in FIG. 2. Specifically, step S1800 of FIG. 18 may be performed by the adder 250 of the encoding apparatus 200 shown in FIG. 2, steps S1810 to S1830 of FIG. 18 may be performed by the filter 260 of the encoding apparatus 200 shown in FIG. 2, and step S1840 of FIG. 18 may be performed by the entropy encoder 240 of the encoding apparatus 200 illustrated in FIG. 2. In addition, the method disclosed in FIG. 18 may include the embodiments described above in the present disclosure. Accordingly, detailed description of redundant parts in FIG. 18 and the above-described embodiments will be omitted or simplified.

Referring to FIG. 18, the encoding apparatus may generate a reconstructed picture based on prediction samples of a current block (S1800).

As an embodiment, the encoding apparatus may determine whether to perform inter-prediction or intra-prediction on the current block and may determine a specific inter-prediction mode or a specific intra-prediction mode based on an RD cost. According to the determined mode, the encoding apparatus may derive prediction samples for the current block.

Then, the encoding apparatus may generate a reconstructed picture based on the prediction samples of the current block. That is, the encoding apparatus may derive residual samples by subtracting the prediction samples from the original samples with respect to the current block and may generate reconstructed samples based on the residual samples and the prediction samples. The encoding apparatus may generate a reconstructed block based on the reconstructed samples of the current block in the picture and may generate a reconstructed picture including the reconstructed blocks.

The encoding apparatus may derive a boundary of the current block in the reconstructed picture as a target boundary for deblocking filtering (S1810).

That is, since the encoding apparatus reconstructs a picture in units of block, block distortion may occur at the boundary between blocks in the reconstructed picture. Accordingly, the encoding apparatus may apply deblocking filtering to remove block distortion occurring at the boundary between blocks in the reconstructed picture, and in this case, a filtering strength may be determined according to the degree of block distortion.

As an embodiment, the encoding apparatus may perform deblocking filtering on a vertical boundary or deblocking filtering on a horizontal boundary and may derive a target boundary for each of the vertical boundary and the horizontal boundary.

For example, the encoding apparatus may derive a block boundary (i.e., a target boundary) on which deblocking filtering is performed based on an N×N size grid. The encoding apparatus may derive the block boundary on which deblocking filtering is performed based on whether the boundary of the current block (transform block or prediction block) corresponds to the N×N size grid. In other words, for example, the encoding apparatus may derive a target boundary on which deblocking filtering is performed based on whether the boundary of the current block (transform block or prediction block) is a block boundary located on the N×N size grid. The encoding apparatus may derive the boundary of the block corresponding to the N×N size grid as the target boundary on which deblocking filtering is performed. Here, the N×N size grid may mean a boundary derived by dividing a reconstructed picture into squares of N×N size. The N×N size grid may be, for example, a 4×4 or 8×8 size grid. Alternatively, the target boundary may be derived based on a 4×4 size grid for a chroma component and an 8×8 size grid for a luma component.

The encoding apparatus may perform deblocking filtering based on a filter length for the target boundary (S1820).

As an embodiment, the encoding apparatus may derive a filter length based on a distance between the target boundary and a target boundary neighboring the target boundary and may perform deblocking filtering based on the filter length.

Here, the filter length may indicate the number of samples in which deblocking filtering is applied to the blocks P and Q with respect to the block boundary (i.e., the target boundary) as described above. For example, for a target boundary that is a vertical boundary, a filter length P may indicate the number of samples (number of luma/chroma samples) applied to a block P adjacent to the left of the target boundary, and a filter length Q may indicate the number of samples (number of luma/chroma samples) applied to a block Q adjacent to the right of the target boundary. Alternatively, for a target boundary that is a horizontal boundary, the filter length P may indicate the number of samples (the number of luma/chroma samples) applied to the block P adjacent to the upper side of the target boundary, and the filter length Q may indicate the number of samples (number of luma/chroma samples) applied to the block Q adjacent to the lower side of the target boundary.

As a specific example, the encoding apparatus may determine whether the current block is a luma component or a chroma component first and then derive a filter length for the luma component and a filter length for the chroma component. Since the above-described embodiments can be applied to the process of deriving such a filter length, description will be simplified in the present embodiment.

For example, for the current block that is a luma component, the filter length may be derived as 0 based on whether a distance between the target boundary and a neighboring target boundary is less than or equal to 4. For example, the encoding apparatus may determine whether a distance between the target boundary and a neighboring target boundary located in the right (or lower) side of the target boundary is less than or equal to 4, and if this condition is satisfied, the encoding apparatus may derive the filter length P and the filter length Q as 0. In other words, the filter lengths may be derived as 0 based on whether the size of the block Q is less than or equal to 4 with respect to the target boundary.

Further, for example, for the current block that is a luma component, the filter length may be derived as 3, 5, or 7 based on whether the distance between the target boundary and the neighboring target boundary is less than or equal to 8 or 16. For example, the encoding apparatus may determine whether the distance between the target boundary and the neighboring target boundary located in the right (or lower) side/left (or upper) side of the target boundary is less than or equal to 8, and if this condition is satisfied, the encoding apparatus may derive the filter length P and the filter length Q as 3. In other words, the filter lengths may be derived as 3 based on whether the size of the block Q or the block P is less than or equal to 8 with respect to the target boundary. Further, as an example, the encoding apparatus may determine whether the distance between the target boundary and the neighboring target boundary located in the right (or lower) side/left (or upper) side of the target boundary is less than or equal to 16, and if this condition is satisfied, the encoding apparatus may derive the filter length P and the filter length Q as 5. In other words, the filter lengths may be derived as 5 based on whether the size of the block Q or the block P is less than or equal to 16 with respect to the target boundary. Further, as an example, the encoding apparatus may determine whether a distance between the target boundary and the neighboring target boundary located in the right (or lower) side/left (or upper) side of the target boundary is greater than 16, and if this condition is satisfied, the encoding apparatus may derive the filter length P and the filter length Q as 7.

For example, for the current block that is a chroma component, the filter length may be derived as 0 based on whether the distance between the target boundary and a neighboring target boundary is less than or equal to 2. As an example, the encoding apparatus may determine whether the distance between the target boundary and the neighboring target boundary located in the right (or lower) side of the target boundary is less than or equal to 2, and if this condition is satisfied, the encoding apparatus may derive the filter length P and the filter length Q as 0. In other words, the filter lengths may be derived as 0 based on whether the size of the block Q is less than or equal to 2 with respect to the target boundary.

Alternatively, for example, for the current block that is a chroma component, the filter length may be derived as 1 or 3 based on whether the distance between the target boundary and the neighboring target boundary is less than or equal to 4. For example, the encoding apparatus may determine whether the distance between the target boundary and the neighboring target boundary located in the right (or lower) side/left (or upper) side of the target boundary is less than or equal to 4, and if this condition is satisfied, the encoding apparatus may derive the filter length P and the filter length Q as 1. In other words, the filter lengths may be derived as 1 based on whether the size of the block Q or the block P is less than or equal to 4 with respect to the target boundary. Further, as an example, the encoding apparatus may determine whether the distance between the target boundary and the neighboring target boundary located in the right (or lower) side/left (or upper) side of the target boundary is greater than 4, and if this condition is satisfied, the encoding apparatus may derive the filter length P and the filter length Q as 3.

The encoding apparatus may determine a boundary strength (bS) for the target boundary, determine whether to apply a strong filter or a weak filter based on the bS and the filter length, and perform deblocking filtering.

In an embodiment, the encoding apparatus may perform deblocking filtering on the target boundary based on whether the boundary strength is greater than 0 for the current block which is a chroma component. For example, when the boundary strength is greater than 0, the encoding apparatus may perform deblocking filtering on the target boundary for the chroma component. On the other hand, when the boundary strength is equal to 0, the encoding apparatus may skip (omit) deblocking filtering at the target boundary for the chroma component. Here, deblocking filtering may include deblocking filtering on a vertical boundary and deblocking filtering on a horizontal boundary.

The encoding apparatus may derive a modified reconstructed picture for the reconstructed picture based on deblocking filtering (S1830).

That is, the encoding apparatus may derive a reconstructed sample from which blocking artifacts have been removed by performing deblocking filtering on the boundary of the current block in the reconstructed picture and may generate a modified reconstructed picture based on the reconstructed sample. Accordingly, it is possible to remove blocking artifacts at a block boundary which occur due to prediction performed in units of a block (in units of a coding block or a coding subblock) and to improve the visual quality of the reconstructed picture.

In addition, the encoding apparatus may further apply an in-loop filtering procedure such as an SAO procedure to the modified reconstructed picture in order to improve subjective/objective picture quality as necessary, as described above.

The encoding apparatus may encode image information including information on the current block (S1840).

Here, the information on the current block may include prediction-related information of the current block. For example, the prediction-related information may include information on the prediction mode of the current block (e.g., intra-prediction mode, inter-prediction mode, affine prediction mode, subblock-based merge mode, IBC mode referring to the current picture, etc.). Further, the information on the current block may include information on residual samples derived based on prediction samples of the current block. For example, the information on the residual samples may include information such as value information, location information, a transformation technique, a transform kernel, and a quantization parameter for quantized transform coefficients derived by performing transformation and quantization on the residual samples.

That is, the encoding apparatus may encode the image information including the information on the current block as described above to generate a bitstream, and transmit the bitstream to a decoding apparatus through a network or a storage medium. Further, the encoding apparatus may encode information (e.g., deblocking filtering related information) derived in the above-described process to generate a bitstream.

Figure 20:
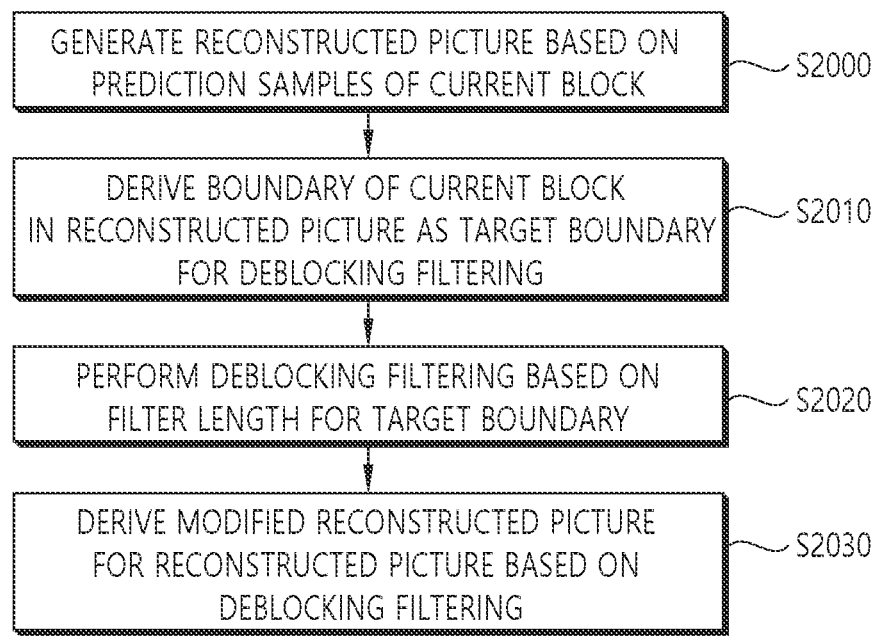
FIG. 20 and FIG. 21 schematically show an example of a video/image decoding method and related components according to embodiment(s) of the present disclosure.
Figure 21:
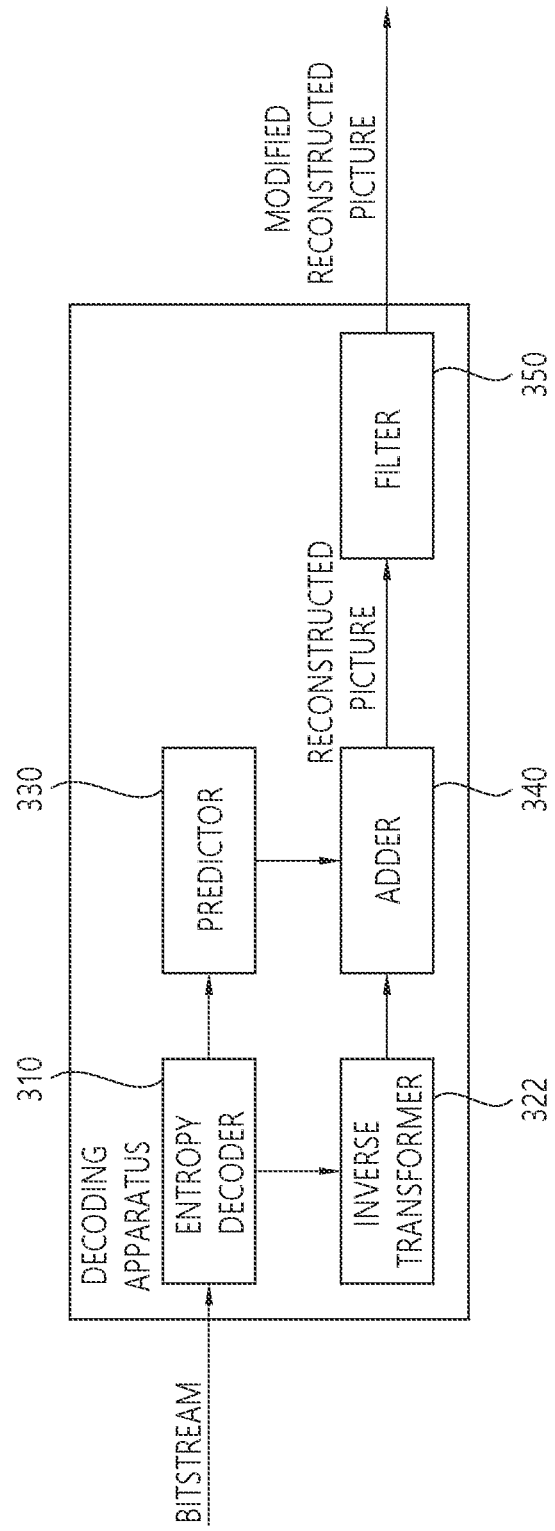

FIG. 20 and FIG. 21 schematically show an example of a video/image decoding method and related components according to embodiment(s) of the present disclosure.

The method disclosed in FIG. 20 may be performed by the decoding apparatus 300 illustrated in FIG. 3. Specifically, step S2000 of FIG. 20 may be performed by the adder 340 of the decoding apparatus 300 illustrated in FIG. 3, and steps S2010 to S2030 of FIG. 20 may be performed by the filter 350 of the decoding apparatus 300 illustrated in FIG. 3. In addition, the method illustrated in FIG. 20 may include the embodiments described above in the present disclosure. Accordingly, detailed description of redundant parts in FIG. 20 and the above-described embodiments will be omitted or simplified.

Referring to FIG. 20, the decoding apparatus may generate a reconstructed picture based on prediction samples of a current block (S2000).

As an embodiment, the decoding apparatus may receive image information on the current block through a bitstream. For example, the decoding apparatus may receive image information including prediction-related information on the current block through a bitstream. In this case, the image information may include prediction related information on the current block. The prediction related information may include information on an inter-prediction mode or an intra-prediction mode performed on the current block. That is, the decoding apparatus may perform inter-prediction or intra-prediction on the current block based on prediction related information received through the bitstream to derive prediction samples of the current block.

In addition, the decoding apparatus may receive image information including residual information on the current block through the bitstream. In this case, the image information may include residual information on the current block. The residual information may include transform coefficients related to residual samples. The decoding apparatus may derive residual samples (or a residual sample array) of the current block based on the residual information.

The decoding apparatus may generate reconstructed samples based on the prediction samples and the residual samples and may generate a reconstructed block based on the reconstructed samples for the current block in a picture. Then, the decoding apparatus may generate a reconstructed picture including reconstructed blocks.

The decoding apparatus may derive a boundary of the current block in the reconstructed picture as a target boundary for deblocking filtering (S2010).

That is, since the decoding apparatus reconstructs a picture in units of a block, block distortion may occur at the boundary between blocks in the reconstructed picture. Accordingly, the decoding apparatus may apply deblocking filtering to remove block distortion occurring at the boundary between blocks in the reconstructed picture, and in this case, a filtering strength may be determined according to the degree of block distortion.

As an embodiment, the decoding apparatus may perform deblocking filtering on a vertical boundary or deblocking filtering on a horizontal boundary and may derive a target boundary for each of the vertical boundary and the horizontal boundary.

For example, the decoding apparatus may derive a block boundary (i.e., a target boundary) on which deblocking filtering is performed based on an N×N size grid. The decoding apparatus may derive the block boundary on which deblocking filtering is performed based on whether the boundary of the current block (transform block or prediction block) corresponds to the N×N size grid. In other words, for example, the decoding apparatus may derive a target boundary on which deblocking filtering is performed based on whether the boundary of the current block (transform block or prediction block) is a block boundary located on the N×N size grid. The decoding apparatus may derive the boundary of the block corresponding to the N×N size grid as the target boundary on which deblocking filtering is performed. Here, the N×N size grid may mean a boundary derived by dividing the reconstructed picture into squares of N×N size. The N×N grid may be, for example, a 4×4 or 8×8 size grid. Alternatively, the target boundary may be derived based on a 4×4 size grid for a chroma component and an 8×8 size grid for a luma component.

The decoding apparatus may perform deblocking filtering based on a filter length for the target boundary (S2020).

As an embodiment, the decoding apparatus may derive a filter length based on a distance between the target boundary and a target boundary neighboring the target boundary and may perform deblocking filtering based on the filter length.

Here, the filter length may indicate the number of samples in which deblocking filtering is applied to the blocks P and Q with respect to the block boundary (i.e., the target boundary) as described above. For example, for a target boundary that is a vertical boundary, a filter length P may indicate the number of samples (number of luma/chroma samples) applied to a block P adjacent to the left of the target boundary, and a filter length Q may indicate the number of samples (number of luma/chroma samples) applied to a block Q adjacent to the right of the target boundary. Alternatively, for a target boundary that is a horizontal boundary, the filter length P may indicate the number of samples (the number of luma/chroma samples) applied to the block P adjacent to the upper side of the target boundary, and the filter length Q may indicate the number of samples (number of luma/chroma samples) applied to the block Q adjacent to the lower side of the target boundary.

As a specific example, the decoding apparatus may determine whether the current block is a luma component or a chroma component first and then derive a filter length for the luma component and a filter length for the chroma component. Since the above-described embodiments can be applied to the process of deriving such a filter length, description will be simplified in the present embodiment.

For example, for the current block that is a luma component, the filter length may be derived as 0 based on whether a distance between the target boundary and a neighboring target boundary is less than or equal to 4. For example, the decoding apparatus may determine whether a distance between the target boundary and a neighboring target boundary located in the right (or lower) side of the target boundary is less than or equal to 4, and if this condition is satisfied, the decoding apparatus may derive the filter length P and the filter length Q as 0. In other words, the filter lengths may be derived as 0 based on whether the size of the block Q is less than or equal to 4 with respect to the target boundary.

Further, for example, for the current block that is a luma component, the filter length may be derived as 3, 5, or 7 based on whether the distance between the target boundary and the neighboring target boundary is less than or equal to 8 or 16. For example, the decoding apparatus may determine whether the distance between the target boundary and the neighboring target boundary located in the right (or lower) side/left (or upper) side of the target boundary is less than or equal to 8, and if this condition is satisfied, the decoding apparatus may derive the filter length P and the filter length Q as 3. In other words, the filter lengths may be derived as 3 based on whether the size of the block Q or the block P is less than or equal to 8 with respect to the target boundary. Further, as an example, the decoding apparatus may determine whether the distance between the target boundary and the neighboring target boundary located in the right (or lower) side/left (or upper) side of the target boundary is less than or equal to 16, and if this condition is satisfied, the decoding apparatus may derive the filter length P and the filter length Q as 5. In other words, the filter lengths may be derived as 5 based on whether the size of the block Q or the block P is less than or equal to 16 with respect to the target boundary. Further, as an example, the decoding apparatus may determine whether the distance between the target boundary and the neighboring target boundary located in the right (or lower) side/left (or upper) side of the target boundary is greater than 16, and if this condition is satisfied, the decoding apparatus may derive the filter length P and the filter length Q as 7.

For example, for the current block that is a chroma component, the filter length may be derived as 0 based on whether the distance between the target boundary and a neighboring target boundary is less than or equal to 2. As an example, the decoding apparatus may determine whether the distance between the target boundary and the neighboring target boundary located in the right (or lower) side of the target boundary is less than or equal to 2, and if this condition is satisfied, the decoding apparatus may derive the filter length P and the filter length Q as 0. In other words, the filter lengths may be derived as 0 based on whether the size of the block Q is less than or equal to 2 with respect to the target boundary.

Alternatively, for example, for the current block that is a chroma component, the filter length may be derived as 1 or 3 based on whether the distance between the target boundary and the neighboring target boundary is less than or equal to 4. For example, the decoding apparatus may determine whether the distance between the target boundary and the neighboring target boundary located in the right (or lower) side/left (or upper) side of the target boundary is less than or equal to 4, and if this condition is satisfied, the decoding apparatus may derive the filter length P and the filter length Q as 1. In other words, the filter lengths may be derived as 1 based on whether the size of the block Q or the block P is less than or equal to 4 with respect to the target boundary. Further, as an example, the decoding apparatus may determine whether the distance between the target boundary and the neighboring target boundary located in the right (or lower) side/left (or upper) side of the target boundary is greater than 4, and if this condition is satisfied, the decoding apparatus may derive the filter length P and the filter length Q as 3.

The decoding apparatus may determine a boundary strength (bS) for the target boundary, determine whether to apply a strong filter or a weak filter based on the bS and the filter length, and perform deblocking filtering.

In an embodiment, the decoding apparatus may perform deblocking filtering on the target boundary based on whether the boundary strength is greater than 0 for the current block which is a chroma component. For example, when the boundary strength is greater than 0, the decoding apparatus may perform deblocking filtering on the target boundary for the chroma component. On the other hand, when the boundary strength is equal to 0, the decoding apparatus may skip (omit) deblocking filtering at the target boundary for the chroma component. Here, deblocking filtering may include deblocking filtering on a vertical boundary and deblocking filtering on a horizontal boundary.

The decoding apparatus may derive a modified reconstructed picture for the reconstructed picture based on deblocking filtering (S2030).

That is, the decoding apparatus may derive a reconstructed sample from which blocking artifacts have been removed by performing deblocking filtering on the boundary of the current block in the reconstructed picture and may generate a modified reconstructed picture based on the reconstructed sample. Accordingly, it is possible to remove blocking artifacts at a block boundary which occur due to prediction performed in units of a block (in units of a coding block or a coding subblock) and to improve the visual quality of the reconstructed picture.

In addition, the decoding apparatus may further apply an in-loop filtering procedure such as an SAO procedure to the modified reconstructed picture in order to improve subjective/objective picture quality as necessary, as described above.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip. In this case, information for implementation (ex. information on instructions) or an algorithm may be stored in a digital storage medium.

Furthermore, the decoding apparatus and the encoding apparatus to which this document is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a virtual reality (VR) device, an augmented reality (AR) device, a video telephony device, transportation means terminal (e.g., a vehicle (including autonomous vehicle) terminal, an aircraft terminal, and a vessel terminal), and a medical video device, and may be used to process a video signal or a data signal. For example, the over the top (OTT) video device may include a game console, a Blueray player, Internet access TV, a home theater system, a smartphone, a tablet PC, and a digital video recorder (DVR).

Furthermore, the processing method to which this document is applied may be produced in the form of a program executed by a computer, and may be stored in a computer-readable recording medium. Multimedia data having a data structure according to this document may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of this document may be implemented as a computer program product using program code. The program code may be performed by a computer according to an embodiment of this document. The program code may be stored on a carrier readable by a computer.

Figure 22:
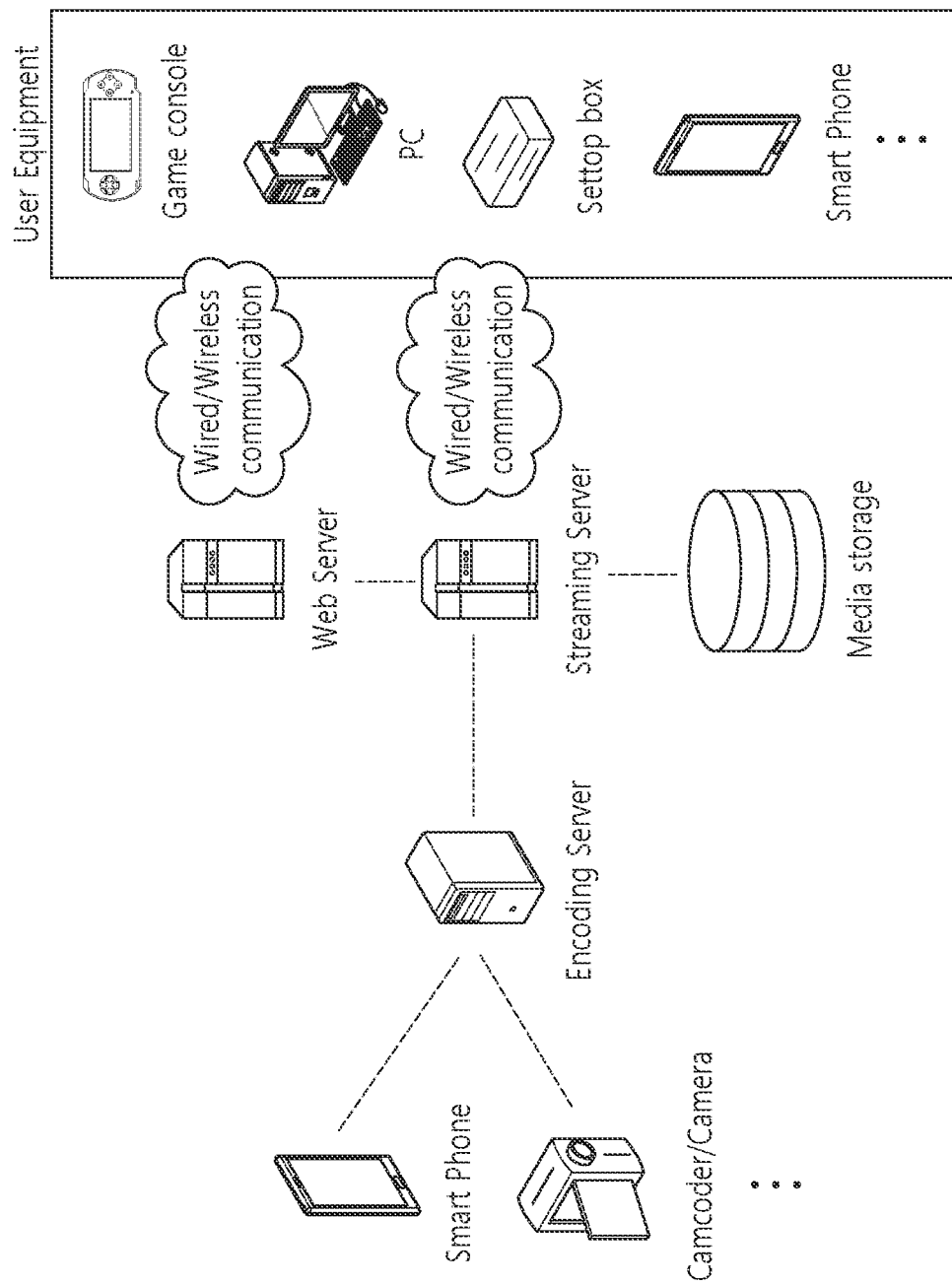
FIG. 22 shows an example of a content streaming system to which embodiments disclosed in the present disclosure are applicable.

FIG. 22 illustrates an example of a content streaming system to which embodiments disclosed in this document may be applied.

Referring to FIG. 22, the content streaming system to which the embodiments of the present document are applied may basically include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present document is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. smartwatches, smart glasses, head mounted displays), digital TVs, desktops computer, digital signage, and the like.

Each server in the content streaming system may be operated as a distributed server, in which case data received from each server may be distributed.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, comprising:
receiving image information including prediction mode information and residual information from a bitstream;
deriving prediction samples of a current block based on the prediction mode information;
deriving residual samples of the current block based on the residual information;
generating a reconstructed picture based on the prediction samples and the residual samples; and
deriving a modified reconstructed picture by performing deblocking filtering on the reconstructed picture,
wherein the deblocking filtering is performed based on a filter length for a target boundary with respect to the current block in the reconstructed picture,
wherein the filter length is derived based on a distance between the target boundary and a neighboring target boundary adjacent to the target boundary,
wherein for the current block that is a luma component, the filter length is derived based on whether the distance between the target boundary and the neighboring target boundary is i) less than or equal to 4, ii) greater than 4 and less than or equal to 8 or 16, or iii) greater than 16,
wherein for the current block that is a chroma component, the filter length is derived based on whether the distance between the target boundary and the neighboring target boundary is i) less than or equal to 4 or ii) greater than 4.

2. An image encoding method performed by an encoding apparatus, comprising:
deriving prediction samples for a current block based on prediction mode information;
deriving residual samples based on the prediction samples;
generating a reconstructed picture based on the prediction samples and the residual samples;
deriving a modified reconstructed picture by performing deblocking filtering on the reconstructed picture;
generating residual information based on the residual samples; and
encoding image information including the prediction mode information and the residual information,
wherein the deblocking filtering is performed based on a filter length for a target boundary with respect to the current block in the reconstructed picture,
wherein the filter length is derived based on a distance between the target boundary and a neighboring target boundary adjacent to the target boundary,
wherein for the current block that is a luma component, the filter length is derived based on whether the distance between the target boundary and the neighboring target boundary is i) less than or equal to 4, ii) greater than 4 and less than or equal to 8 or 16, or iii) greater than 16,
wherein for the current block that is a chroma component, the filter length is derived based on whether the distance between the target boundary and the neighboring target boundary is i) less than or equal to 4 or ii) greater than 4.

3. A non-transitory computer-readable digital storage medium storing a bitstream comprising the image information encoded by the image encoding method of claim 2.

4. A method for transmitting data for image information, the method comprising:
obtaining a bitstream of the image information, wherein the bitstream is generated based on deriving prediction samples for a current block based on prediction mode information, deriving residual samples based on the prediction samples, generating a reconstructed picture based on the prediction samples and the residual samples, deriving a modified reconstructed picture by performing deblocking filtering on the reconstructed picture, generating residual information based on the residual samples, and encoding image information including the prediction mode information and the residual information; and
transmitting the data comprising the bitstream,
wherein the deblocking filtering is performed based on a filter length for a target boundary with respect to the current block in the reconstructed picture,
wherein the filter length is derived based on a distance between the target boundary and a neighboring target boundary adjacent to the target boundary,
wherein for the current block that is a luma component, the filter length is derived based on whether the distance between the target boundary and the neighboring target boundary is i) less than or equal to 4, ii) greater than 4 and less than or equal to 8 or 16, or iii) greater than 16,
wherein for the current block that is a chroma component, the filter length is derived based on whether the distance between the target boundary and the neighboring target boundary is i) less than or equal to 4 or ii) greater than 4.

* * * * *